US010970891B2

(12) United States Patent
Garvey et al.

(10) Patent No.: US 10,970,891 B2
(45) Date of Patent: Apr. 6, 2021

(54) SYSTEMS AND METHODS FOR DETECTING AND ACCOMMODATING STATE CHANGES IN MODELLING

(71) Applicant: Oracle International Corporation, Redwood Shores, CA (US)

(72) Inventors: Dustin Garvey, Oakland, CA (US); Uri Shaft, Fremont, CA (US); Sampanna Shahaji Salunke, Dublin, CA (US); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 724 days.

(21) Appl. No.: 15/266,979

(22) Filed: Sep. 15, 2016

(65) Prior Publication Data

US 2017/0249564 A1 Aug. 31, 2017

Related U.S. Application Data

(60) Provisional application No. 62/301,590, filed on Feb. 29, 2016, provisional application No. 62/301,585, filed on Feb. 29, 2016.

(51) Int. Cl.
*G06Q 30/02* (2012.01)
*G06N 20/00* (2019.01)
(Continued)

(52) U.S. Cl.
CPC ........ *G06T 11/206* (2013.01); *G06F 11/3452* (2013.01); *G06F 17/18* (2013.01);
(Continued)

(58) Field of Classification Search
CPC ..... G06N 20/00; G06T 11/206; G06T 11/001; G06F 11/3452; G06F 17/18; G06F 21/55;
(Continued)

(56) References Cited

U.S. PATENT DOCUMENTS 6,298,063 B1 10/2001 Coile et al.
6,438,592 B1 8/2002 Killian
(Continued)

FOREIGN PATENT DOCUMENTS

CN 105426411 A 3/2016
CN 109359763 A 2/2019
(Continued)

OTHER PUBLICATIONS

Li et al., "Forecasting Web Page Views: Methods and Observations," in 9 J. Machine Learning Res. 2217-50 (2008). (Year: 2008).*

(Continued)

*Primary Examiner* — Kamran Afshar
*Assistant Examiner* — Ryan C Vaughn
(74) *Attorney, Agent, or Firm* — Invoke

(57) ABSTRACT

Techniques are described for automatically detecting and accommodating state changes in a computer-generated forecast. In one or more embodiments, a representation of a time-series signal is generated within volatile and/or non-volatile storage of a computing device. The representation may be generated in such a way as to approximate the behavior of the time-series signal across one or more seasonal periods. Once generated, a set of one or more state changes within the representation of the time-series signal is identified. Based at least in part on at least one state change in the set of one or more state changes, a subset of values from the sequence of values is selected to train a model. An analytical output is then generated, within volatile and/or non-volatile storage of the computing device, using the trained model.

20 Claims, 12 Drawing Sheets

(51) Int. Cl.
| | |
|---|---|
| *G06Q 10/04* | (2012.01) |
| *G06F 17/18* | (2006.01) |
| *G06Q 10/06* | (2012.01) |
| *G06K 9/00* | (2006.01) |
| *G06K 9/62* | (2006.01) |
| *G06F 11/34* | (2006.01) |
| *H04L 12/24* | (2006.01) |
| *G06F 9/50* | (2006.01) |
| *G06T 11/20* | (2006.01) |
| *G06F 21/55* | (2013.01) |
| *G06Q 10/10* | (2012.01) |
| *G06T 11/00* | (2006.01) |

(52) U.S. Cl.
CPC ......... *G06F 21/55* (2013.01); *G06K 9/00536* (2013.01); *G06K 9/628* (2013.01); *G06N 20/00* (2019.01); *G06Q 10/04* (2013.01); *G06Q 10/06* (2013.01); *G06Q 10/0631* (2013.01); *G06Q 10/1093* (2013.01); *G06Q 30/0202* (2013.01); *G06T 11/001* (2013.01); *G06F 9/505* (2013.01); *G06Q 10/06315* (2013.01); *H04L 41/0896* (2013.01)

(58) Field of Classification Search
CPC .... G06F 9/505; G06K 9/00536; G06K 9/628; G06Q 10/04; G06Q 10/06; G06Q 10/0631; G06Q 10/1093; G06Q 30/0202; G06Q 10/06315; H04L 41/0896
See application file for complete search history.

(56) References Cited

U.S. PATENT DOCUMENTS

| | | | |
|---|---|---|---|
| 6,597,777 | B1 | 7/2003 | Ho |
| 6,643,613 | B2 | 11/2003 | McGee et al. |
| 6,996,599 | B1 | 2/2006 | Anders et al. |
| 7,343,375 | B1 | 3/2008 | Dulac |
| 7,529,991 | B2 | 5/2009 | Ide et al. |
| 7,672,814 | B1 | 3/2010 | Raanan et al. |
| 7,739,143 | B1 | 6/2010 | Dwarakanath et al. |
| 7,739,284 | B2 | 6/2010 | Aggarwal et al. |
| 7,783,510 | B1 | 8/2010 | Gilgur et al. |
| 7,987,106 | B1 | 7/2011 | Aykin |
| 8,200,454 | B2 | 6/2012 | Dorneich et al. |
| 8,229,876 | B2 | 7/2012 | Roychowdhury |
| 8,234,236 | B2 | 7/2012 | Beaty et al. |
| 8,363,961 | B1 | 1/2013 | Avidan et al. |
| 8,576,964 | B2 | 11/2013 | Taniguchi et al. |
| 8,635,328 | B2 | 1/2014 | Corley et al. |
| 8,650,299 | B1 | 2/2014 | Huang et al. |
| 8,676,964 | B2 | 3/2014 | Gopalan et al. |
| 8,694,969 | B2 | 4/2014 | Bernardini et al. |
| 8,776,066 | B2 | 7/2014 | Krishnamurthy et al. |
| 8,880,525 | B2 | 11/2014 | Galle et al. |
| 8,930,757 | B2 | 1/2015 | Nakagawa |
| 8,949,677 | B1 | 2/2015 | Brundage et al. |
| 9,002,774 | B2 | 4/2015 | Karlsson |
| 9,141,914 | B2 | 9/2015 | Viswanathan et al. |
| 9,147,167 | B2 | 9/2015 | Urmanov et al. |
| 9,195,563 | B2 | 11/2015 | Scarpelli |
| 9,218,232 | B2 | 12/2015 | Khalastchi et al. |
| 9,292,408 | B2 | 3/2016 | Bernstein et al. |
| 9,323,599 | B1 | 4/2016 | Iyer et al. |
| 9,323,837 | B2 | 4/2016 | Zhao et al. |
| 9,330,119 | B2 | 5/2016 | Chan et al. |
| 9,355,357 | B2 | 5/2016 | Hao et al. |
| 9,367,382 | B2 | 6/2016 | Yabuki |
| 9,389,946 | B2 | 7/2016 | Higuchi |
| 9,471,778 | B1 | 10/2016 | Seo et al. |
| 9,495,220 | B2 | 11/2016 | Talyansky |
| 9,495,395 | B2 | 11/2016 | Chan et al. |
| 9,507,718 | B2 | 11/2016 | Rash et al. |
| 9,514,213 | B2 | 12/2016 | Wood et al. |
| 9,529,630 | B1 | 12/2016 | Fakhouri et al. |
| 9,658,916 | B2 | 5/2017 | Yoshinaga et al. |
| 9,692,662 | B2 | 6/2017 | Chan et al. |
| 9,710,493 | B2 | 7/2017 | Wang et al. |
| 9,727,533 | B2 | 8/2017 | Thibaux |
| 9,740,402 | B2 | 8/2017 | Manoharan et al. |
| 9,779,361 | B2 | 10/2017 | Jones et al. |
| 9,811,394 | B1 | 11/2017 | Kogias et al. |
| 9,961,571 | B2 | 5/2018 | Yang et al. |
| 10,073,906 | B2 | 9/2018 | Lu et al. |
| 10,210,036 | B2 | 2/2019 | Iyer et al. |
| 10,692,255 | B2 | 6/2020 | Garvey et al. |
| 2002/0019860 | A1 | 2/2002 | Lee et al. |
| 2002/0092004 | A1 | 7/2002 | Lee et al. |
| 2002/0183972 | A1 | 12/2002 | Enck et al. |
| 2002/0188650 | A1 | 12/2002 | Sun et al. |
| 2003/0149603 | A1 | 8/2003 | Ferguson et al. |
| 2003/0224344 | A1 | 12/2003 | Shamir et al. |
| 2005/0119982 | A1 | 6/2005 | Ito et al. |
| 2005/0132030 | A1 | 6/2005 | Hopen et al. |
| 2005/0159927 | A1 | 7/2005 | Cruz et al. |
| 2005/0193281 | A1 | 9/2005 | Ide et al. |
| 2006/0087962 | A1 | 4/2006 | Golia et al. |
| 2006/0106743 | A1 | 5/2006 | Horvitz |
| 2006/0212593 | A1 | 9/2006 | Patrick et al. |
| 2006/0287848 | A1 | 12/2006 | Li et al. |
| 2007/0011281 | A1 | 1/2007 | Jhoney et al. |
| 2007/0150329 | A1 | 6/2007 | Brook et al. |
| 2007/0179836 | A1 | 8/2007 | Juang et al. |
| 2008/0221974 | A1 | 9/2008 | Gilgur et al. |
| 2008/0288089 | A1 | 11/2008 | Pettus et al. |
| 2009/0030752 | A1 | 1/2009 | Senturk-Doganaksoy et al. |
| 2010/0027552 | A1 | 2/2010 | Hill |
| 2010/0036857 | A1* | 2/2010 | Marvasti ............... G06F 16/285 707/725 |
| 2010/0050023 | A1 | 2/2010 | Scarpelli et al. |
| 2010/0082132 | A1 | 4/2010 | Marruchella et al. |
| 2010/0082697 | A1 | 4/2010 | Gupta et al. |
| 2010/0185499 | A1 | 7/2010 | Dwarakanath et al. |
| 2010/0257133 | A1 | 10/2010 | Crowe et al. |
| 2010/0324869 | A1 | 12/2010 | Cherkasova et al. |
| 2011/0022879 | A1 | 1/2011 | Chavda et al. |
| 2011/0040575 | A1 | 2/2011 | Wright et al. |
| 2011/0125894 | A1 | 5/2011 | Anderson et al. |
| 2011/0126197 | A1 | 5/2011 | Larsen et al. |
| 2011/0126275 | A1 | 5/2011 | Anderson et al. |
| 2011/0213788 | A1 | 9/2011 | Zhao et al. |
| 2011/0265164 | A1 | 10/2011 | Lucovsky et al. |
| 2012/0005359 | A1 | 1/2012 | Seago et al. |
| 2012/0051369 | A1 | 3/2012 | Bryan et al. |
| 2012/0066389 | A1 | 3/2012 | Hegde et al. |
| 2012/0110462 | A1 | 5/2012 | Eswaran et al. |
| 2012/0110583 | A1 | 5/2012 | Balko et al. |
| 2012/0203823 | A1 | 8/2012 | Manglik et al. |
| 2012/0240072 | A1 | 9/2012 | Altamura et al. |
| 2012/0254183 | A1 | 10/2012 | Ailon et al. |
| 2012/0278663 | A1 | 11/2012 | Hasegawa |
| 2012/0323988 | A1 | 12/2012 | Barzel et al. |
| 2013/0024173 | A1 | 1/2013 | Brzezicki et al. |
| 2013/0080374 | A1 | 3/2013 | Karlsson |
| 2013/0151179 | A1 | 6/2013 | Gray |
| 2013/0326202 | A1 | 12/2013 | Rosenthal et al. |
| 2013/0329981 | A1* | 12/2013 | Hiroike ................ G06T 7/0012 382/132 |
| 2014/0058572 | A1 | 2/2014 | Stein et al. |
| 2014/0067757 | A1 | 3/2014 | Ailon et al. |
| 2014/0095422 | A1 | 4/2014 | Solomon et al. |
| 2014/0101300 | A1 | 4/2014 | Rosensweig et al. |
| 2014/0215470 | A1 | 7/2014 | Iniguez |
| 2014/0310235 | A1 | 10/2014 | Chan et al. |
| 2014/0325649 | A1 | 10/2014 | Zhang |
| 2014/0379717 | A1 | 12/2014 | Urmanov et al. |
| 2015/0032775 | A1 | 1/2015 | Yang et al. |
| 2015/0033084 | A1 | 1/2015 | Sasturkar et al. |
| 2015/0040142 | A1 | 2/2015 | Cheetancheri et al. |
| 2015/0046123 | A1 | 2/2015 | Kato |
| 2015/0046920 | A1 | 2/2015 | Allen |
| 2015/0065121 | A1 | 3/2015 | Gupta et al. |
| 2015/0180734 | A1 | 6/2015 | Maes et al. |

(56) References Cited

U.S. PATENT DOCUMENTS

| | | | |
|---|---|---|---|
| 2015/0242243 A1 | 8/2015 | Balakrishnan et al. | |
| 2015/0244597 A1 | 8/2015 | Maes et al. | |
| 2015/0248446 A1 | 9/2015 | Nordstrom et al. | |
| 2015/0251074 A1* | 9/2015 | Ahmed | A61B 5/02405 700/91 |
| 2015/0296030 A1 | 10/2015 | Maes et al. | |
| 2015/0302318 A1* | 10/2015 | Chen | G06N 20/00 706/12 |
| 2015/0312274 A1 | 10/2015 | Bishop et al. | |
| 2015/0317589 A1* | 11/2015 | Anderson | G06Q 10/0631 705/7.25 |
| 2016/0034328 A1 | 2/2016 | Poola et al. | |
| 2016/0042289 A1 | 2/2016 | Poola et al. | |
| 2016/0092516 A1 | 3/2016 | Poola et al. | |
| 2016/0105327 A9 | 4/2016 | Cremonesi et al. | |
| 2016/0139964 A1 | 5/2016 | Chen et al. | |
| 2016/0171037 A1 | 6/2016 | Mathur et al. | |
| 2016/0253381 A1 | 9/2016 | Kim et al. | |
| 2016/0283533 A1 | 9/2016 | Urmanov et al. | |
| 2016/0292611 A1 | 10/2016 | Boe et al. | |
| 2016/0294773 A1 | 10/2016 | Yu et al. | |
| 2016/0299938 A1 | 10/2016 | Malhotra et al. | |
| 2016/0299961 A1 | 10/2016 | Olsen | |
| 2016/0321588 A1 | 11/2016 | Das et al. | |
| 2016/0342909 A1* | 11/2016 | Chu | G06Q 10/063 |
| 2016/0357674 A1 | 12/2016 | Waldspurger et al. | |
| 2016/0378809 A1 | 12/2016 | Chen et al. | |
| 2017/0061321 A1 | 3/2017 | Maiya et al. | |
| 2017/0249564 A1 | 8/2017 | Garvey et al. | |
| 2017/0249648 A1 | 8/2017 | Garvey et al. | |
| 2017/0249649 A1 | 8/2017 | Garvey et al. | |
| 2017/0249763 A1 | 8/2017 | Garvey et al. | |
| 2017/0262223 A1 | 9/2017 | Dalmatov et al. | |
| 2017/0329660 A1 | 11/2017 | Salunke et al. | |
| 2017/0351563 A1 | 12/2017 | Miki et al. | |
| 2017/0364851 A1 | 12/2017 | Maheshwari et al. | |
| 2018/0026907 A1 | 1/2018 | Miller et al. | |
| 2018/0039555 A1 | 2/2018 | Salunke et al. | |
| 2018/0052804 A1* | 2/2018 | Mikami | G06Q 10/04 |
| 2018/0053207 A1 | 2/2018 | Modani et al. | |
| 2018/0059628 A1 | 3/2018 | Yoshida | |
| 2018/0081629 A1 | 3/2018 | Kuhhirte et al. | |
| 2018/0219889 A1 | 8/2018 | Oliner et al. | |
| 2018/0321989 A1 | 11/2018 | Shetty et al. | |
| 2018/0324199 A1 | 11/2018 | Crotinger et al. | |
| 2018/0330433 A1 | 11/2018 | Frenzel et al. | |
| 2019/0042982 A1 | 2/2019 | Qu et al. | |
| 2019/0065275 A1 | 2/2019 | Wong et al. | |
| 2019/0305876 A1 | 10/2019 | Sundaresan et al. | |
| 2020/0034745 A1 | 1/2020 | Nagpal et al. | |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Haugen et al., "Extracting Common Time Trends from Concurrent Time Series: Maximum Autocorrelation Factors with Applications", Stanford University, Oct. 20, 2015, pp. 1-38.

Charapko, Gorilla—Facebook's Cache for Time Series Data, http://charap.co/gorilla-facebooks-cache-for-monitoring-data/, Jan. 11, 2017.

Niino, Junichi, "Open Source Cloud Infrastructure 'OpenStack', its History and Scheme", Jun. 13, 2011, 8 pages.

Voras, et al., "Criteria for Evaluation of Open Source Cloud Computing Solutions", Proceedings of the ITI 2011 33rd Int. Conf. on Information Technology Interfaces, Jun. 27-30, 2011, Cavtat, Croatia, pp. 137-142.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Taylor et al., "Forecasting Intraday Time Series With Multiple Seasonal Cycles Using Parsimonious Seasonal Exponential Smoothing", Omega, vol. 40, No. 6, Dec. 2012, pp. 748-757.

Slipetskyy, Rostyslav, "Security Issues in OpenStack", Master's Thesis. Technical University of Denmark, NTNU (Norwegian University of Science and Technology), Jun. 2011, p. 7, 90 pages (entire document especially abstract).

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Ahmed, Reservoir-based network traffic stream summarization for anomaly detection, Article in Pattern Analysis and Applications, Oct. 2017.

Yokoyama, Tetsuya, "Windows Server 2008 Test Results Part 5 Letter", No. 702 (Temporary issue number), Apr. 15, 2008, pp. 124-125.

Willy Tarreau: "HAProxy Architecture Guide", May 25, 2008 (May 25, 2008), XP055207566, Retrieved from the Internet: URL:http://www.haproxy.org/download/1.2/doc/architecture.txt. [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Somlo, Gabriel, et al., "Incremental Clustering for Profile Maintenance in Information Gathering Web Agents", AGENTS '01, Montreal, Quebec, Canada, May 28-Jun. 1, 2001, pp. 262-269.

Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.

NPL: Web document dated Feb. 3, 2011, Title: OpenStack Compute, Admin Manual.

Jarvis, R. A., et al., "Clustering Using a Similarity Measure Based on Shared Neighbors", IEEE Transactions on Computers, vol. C-22, No. 11, Nov. 1973, pp. 1025-1034.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemake-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

(56) References Cited

OTHER PUBLICATIONS

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

Greunen, "Forecasting Methods for Cloud Hosted Resources, a comparison," 2015, 11th International Conference on Network and Service Management (CNSM), pp. 29-35 (Year: 2015).

Wilks, Samuel S. "Determination of sample sizes for setting tolerance limits," The Annals of Mathematical Statistics 12.1 (1941): 91-96.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream," IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Time Series Pattern Search: A tool to extract events from time series data, available online at <https://www.ceadar.ie/pages/time-series-pattern-search/>, retrieved on Apr. 24, 2020, 4 pages.

Yin, "System resource utilization analysis and prediction for cloud based applications under bursty workloads," 2014, Information Sciences, vol. 279, pp. 338-357 (Year: 2014).

"Time Series Pattern Search: A tool to extract events from time series data", available online at <https://www.ceadar.ie/pages/time-series-pattem-search/>, retrieved on Apr. 24, 2020, 4 pages.

Suntinger, "Trend-based similarity search in time-series data," 2010, Second International Conference on Advances in Databases, Knowledge, and Data Applications, IEEE, pp. 97-106 (Year: 2010).

Herbst, "Self-adaptive workload classification and forecasting for proactive resource provisioning", 2014, ICPE'13, pp. 187-198 (Year: 2014).

Faraz Rasheed, "A Framework for Periodic Outlier Pattern Detection in Time-Series Sequences," May 2014, IEEE.

Jain and Chlamtac, P-Square Algorithm for Dynamic Calculation of Quantiles and Histograms Without Storing Observations, ACM, Oct. 1985 (10 pages).

\* cited by examiner

US 10,970,891 B2

SYSTEMS AND METHODS FOR DETECTING AND ACCOMMODATING STATE CHANGES IN MODELLING

BENEFIT CLAIM; RELATED APPLICATIONS

This application claims the benefit of U.S. Provisional Patent Appl. No. 62/301,590, entitled "SEASONAL AWARE METHOD FOR FORECASTING AND CAPACITY PLANNING", filed Feb. 29, 2016, and U.S. Provisional Patent Appln. No. 62/301,585, entitled "METHOD FOR CREATING PERIOD PROFILE FOR TIME-SERIES DATA WITH RECURRENT PATTERNS", filed Feb. 29, 2016, the entire contents for each of which are incorporated by reference herein as if set forth in their entirety.

This application is related to U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and U.S. application Ser. No. 15/057,062, entitled "UNSUPERVISED METHOD FOR CLASSIFYING SEASONAL PATTERNS", the entire contents for each of which are incorporated by reference herein as if set forth in their entirety.

TECHNICAL FIELD

The present disclosure relates to computer-implemented techniques for generating forecasts. In particular, the present disclosure relates to detecting and accommodating state changes in a time-series signal when generating projections of future values.

BACKGROUND

Organizations, data analysts, and other entities are often interested in forecasting future values for a time-series signal. In the context of capacity planning, for example, a forecast may be used to determine how many hardware and/or software resources to deploy to keep up with demand. An inaccurate forecast may result in poor capacity planning decisions, leading to an inefficient allocation of resources. For instance, a forecast that underestimates future demand may lead to insufficient hardware and/or software resources being deployed to handle incoming requests. As a result, the deployed resources may be over-utilized, increasing the time spent on processing each request and causing performance degradation. On the other hand, a forecast that overestimates future demand may result in too many resources being deployed. In this case, the deployed resources may be underutilized, which increases costs and inefficiencies associated with maintaining a datacenter environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
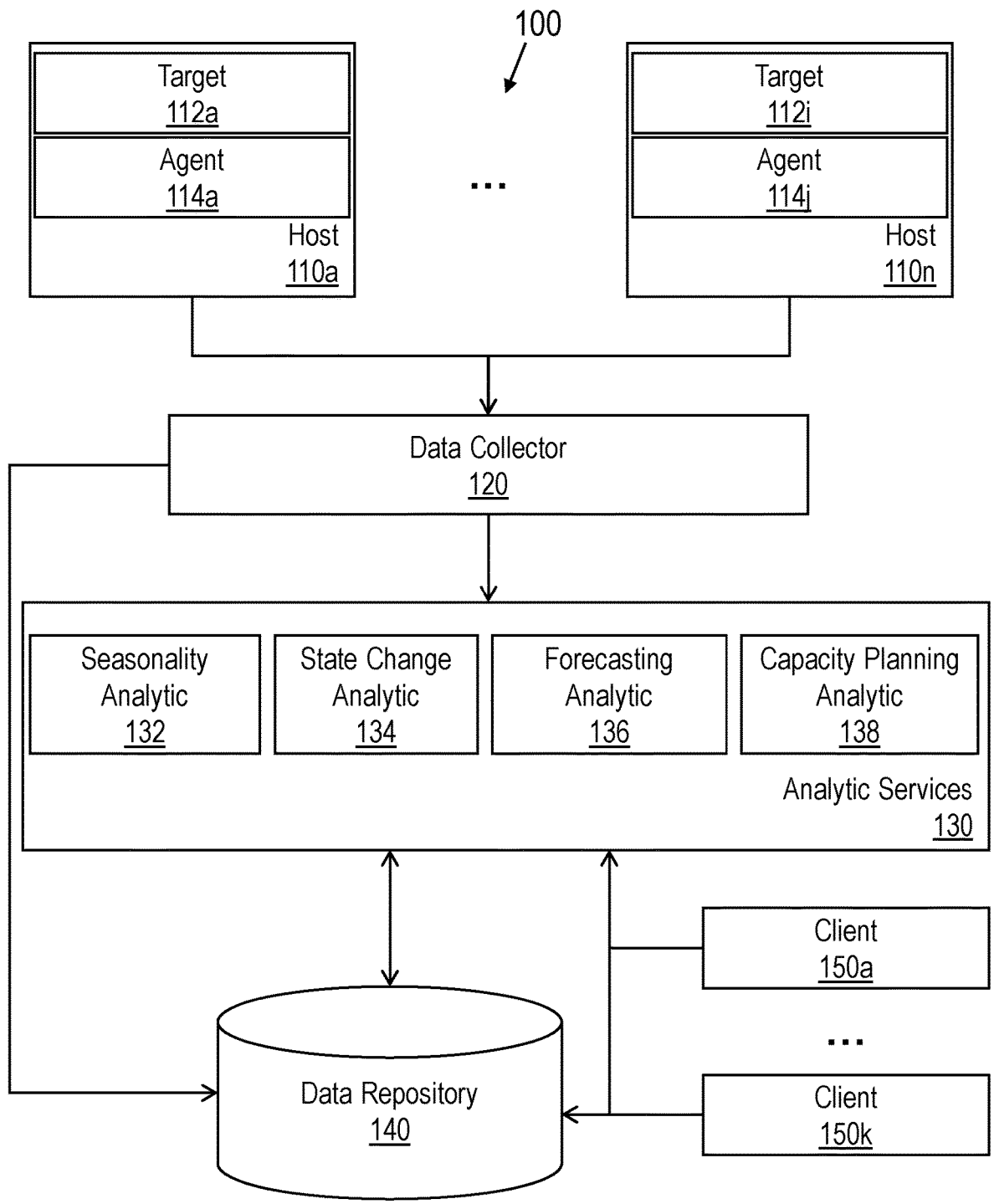
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. STATE CHANGE DETECTION AND ACCOMMODATION ANALYTIC OVERVIEW
4. TIME-SERIES REPRESENTATIONS
5. STATE CHANGE DETECTION AND PROCESSING
6. FORECAST GENERATION AND OTHER ANALYTIC OUTPUTS
7. HARDWARE OVERVIEW
8. MISCELLANEOUS; EXTENSIONS

1. General Overview

A time-series signal may exhibit various behaviors such as seasonal variations in peaks and lows, trends, and/or states. A failure to account for such characteristics may result in unreliable forecasts and, as previously indicated, poor planning decisions. For instance, a middleware administrator in charge of a web-service based application may be responsible for ensuring that there are enough hardware and/or software resources during peak times to satisfy demand. The administrator may plot a trend line using a linear regression model to predict whether current hardware is sufficient for peak months. However, linear regression does not account for seasonal fluctuations in the time-series. In the event that online traffic is greatly reduced in the late evening hours, the linear regression model may underestimate future peak values or overestimate future trough values, both of which lead to a wasteful use of computational resources (including computer hardware, software, storage, and processor resources, and any services or other resources built on top of those resources). Other seasonal factors, such as increased volume around holidays or sales event, as well as non-seasonal factors, such as changes in the state of a signal due to external factors, may also cause the linear regression model to generate inaccurate forecasts.

In addition, linear regression models generally do not account for potential state changes in the time series data when formulating predictions about future values. A large step down in the time-series caused by a state change may lead the linear regression model to significantly overestimate future values while a step up in the time-series may lead the linear regression model to significantly underestimate future values. Thus, in the context of capacity planning operations, a failure to accommodate step changes into the forecast may result in inefficient use and deployment of computational resources.

Rather than relying on linear regression, an administrator may instead use a Holt-Winters forecasting model to account for seasonality in the time-series. The Holt-Winters forecasting model relies on a triple exponential smoothing function to model levels, trends, and seasonality within the time-series. A "season" in this context refers to a period of time before an exhibited behavior begins to repeat itself. The additive seasonal model is given by the following formulas:

$$L_t = \alpha(X_t/S_{t-p}) + (1-\alpha)(L_{t-1}+T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + kT_t + S_{t-k-p} \quad (4)$$

where $F_{t+k}$ denotes the forecast at future time t+k.

The additive seasonal model is typically applied when seasonal fluctuations are independent of the overall level of the time-series data. An alternative, referred to as the multiplicative model, is often applied if the size of seasonal fluctuations vary based on the overall level of the time series data. The multiplicative model is given by the following formulas:

$$L_t = \alpha(X_t/S_{t-p}) + (1-\alpha)(L_{t-1}+T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index at time t, respectively. The forecast is then given by the following formula:

$$F_{t+k} = (L_t + k\,T_t)S_{t+k-p} \quad (8)$$

While the Holt-Winter additive and multiplicative models take into account seasonal indices to generate the forecast, these models can be brittle in the manner in which forecasts are generated. If a user has not carefully defined the context of an input set of data to accommodate the eccentricities of an environment in which time-series data are captured, then the Holt-Winters model may generate inaccurate results. For instance, the above forecasting models are not tailored to determine if a seasonal pattern or other characteristic of a time-series has gone through a change in state. If the user has not explicitly defined how the state change should be handled, then multiple states may affect the projections output by the forecasting model, leading to overestimates and/or underestimates of future resource usage. A user may attempt to manually filter the time-series data that are used to train the model in an attempt to mitigate the impact of a time-series having multiple states; however, the user may not always be aware and/or able to detect changes in the state of a time-series signal. Also, manually inputting this data each time a state change is detected may be difficult and cumbersome, especially in systems where state changes are frequent.

Systems and methods are described through which state changes within a time-series signal may be automatically detected and accommodated in a forecast or other analytical model. A "state change" in this context refers to a change in the "normal" characteristics of the signal. For instance, time-series data before a particular point in time (a "change time") may exhibit a first pattern or set of one or more characteristics that are determined to be normal. After the change time, the time-series data may exhibit a second pattern or second set of characteristics that were not normal before the change time. In other words, a state change results in a "new normal" for the time-series signal. The system may determine whether a change is normal or not by analyzing the patterns within the signal, as described further herein.

In one or more embodiments, a process for automatically detecting and accommodating state changes comprises generating, within volatile and/or non-volatile storage, a representation of a time-series signal. The representation may be generated in such a way as to approximate the behavior of the time-series signal across one or more seasonal periods. Once generated, the process identifies a set of one or more state changes within the representation of the time-series signal. The process then selects, based at least in part on at least one state change in the set of one or more state changes, a subset of values from the sequence of values to train a forecasting or other analytical model and trains the analytical model using the selected subset of values. The subset of values may exclude one, two, or more values within a state that occurs previous to a state change to allow the model to generate a steady-state forecast as if there were no state changes in the time-series signal and no state changes in the forecast. The process generates, within volatile and/or non-volatile storage, forecast data and/or some other analytical output using the trained analytical model.

Automatic detection and accommodation of state changes into forecasting models allows for more accurate forecasts to be generated without the visual guesswork of human analysts. For instance, in a cloud or datacenter environment, updates to software and/or hardware resources deployed within the environment may result in a new normal for the resources. By automatically accommodating these state changes, the forecasting model may more rapidly adjust to the new normal of the environment and generate more accurate projections about future resource patterns. The increased accuracy in forecasts may lead to greater efficiency in resource deployment and utilization.

2. Architectural Overview

A time series signal comprises a sequence of values that are captured over time. The source of the time series data and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

FIG. 1 illustrates an example system for generating forecasts based on time-series data captured by one or more host devices. System 100 generally comprises hosts 110a to 110n, data collector 120, analytic services 130, data repository 140, and clients 150a to 150k. Components of system 100 may be implemented in one or more host machines operating within one or more clouds or other networked environments, depending on the particular implementation.

Hosts 110a to 110n represent a set of one or more network hosts and generally comprise targets 112a to 112i and agents 114a to 114j. A "target" in this context refers to a resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

Agents 114a to 114j comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEM) accelerometers, thermometers, pressure sensors, etc., that capture time-series measurements of a physical environment and/or resource. Although only one agent and target is illustrated per host in FIG. 1, the number of agents and/or targets per host may vary from implementation to implementation. Multiple agents may be installed on a given host to monitor different target sources of time series data.

Data collector 120 includes logic for aggregating data captured by agents 114a to 114j into a set of one or more time-series. Data collector 120 may store the time series data in data repository 140 and/or provide the time-series data to analytic services 130. In one or more embodiments, data collector 120 receives data from agents 114a to 114j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Analytic services 130 include a set of analytics that may be invoked to process time-series data. Analytic services 130 may be executed by one or more of hosts 110a to 110n or by one or more separate hosts, such as a server appliance. Analytic services 130 comprises seasonality analytic 132, state change analytic 134, forecasting analytic 136, and capacity planning analytic 138. Each logic unit implements a function or set of functions for processing the collected time series data and generating forecast data.

Seasonality analytic 132 includes logic for detecting and classifying seasonal behaviors within an input time-series signal. In one or more embodiments, seasonality analytic 132 may generate seasonal patterns that approximate detected seasonal behavior within a time-series and/or classify seasonal patterns/behaviors according to techniques described in U.S. application Ser. No. 15/140,358, entitled "SCALABLE TM-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and/or U.S. application Ser. No. 15/057,062, entitled "UNSUPERVISED METHOD FOR CLASSIFYING SEASONAL PATTERNS", the entire contents for each of which were previously incorporated by reference herein as if set forth in their entirety. For instance, seasonality analytic 132 may identify and classify sparse highs, dense highs, sparse lows, and/or dense lows that are seasonal within an input set of time-series data.

State change analytic 134 includes logic for detecting and accommodating state changes within the input time-series signal. In one or more embodiments, state change analytic 134 selects a set of training data used by forecasting analytic 136 to train a forecasting model in a manner that accommodates state changes, if any, that exist within a time-series signal. Example logic for detecting and accommodating state changes is described in further detail in the sections below.

Forecasting analytic 136 includes logic for training forecasting models and generating forecasts based on the trained forecasting models. In one or more embodiments, the forecasts that are generated account for seasonal patterns, if any, that are detected by seasonality analytic 132 and state changes that are detected, if any, by state change analytic 134. The forecasting model that is implemented by forecasting analytic 136 may vary depending on the particular implementation. In one or more embodiments, forecasting analytic 136 may implement a forecasting model such as described in U.S. Appln. No. 62/301,590, entitled "SEASONAL AWARE METHOD FOR FORECASTING AND CAPACITY PLANNING", which was previously incorporated by reference herein as if set forth in their entirety. The forecasting models are trained based on the detected seasonal patterns in an input time-series signal and used to project future values for the time-series signal. In other embodiments, the techniques described herein may be applied to other forecasting models such as the Holt-Winters models described above to generated forecasts. State change analytic 134 may thus accommodate state changes for a variety of different forecasting models.

Capacity planning analytic 138 includes logic for performing and/or recommending capacity planning operations. For example, capacity planning analytic 138 may automatically deploy additional software resources on one or more hosts to satisfy forecasted demands on system 100. As another example, capacity planning analytic 138 may generate and display a recommendation to acquire additional hardware resources to satisfy a forecasted increase in demand. In yet another example, capacity planning analytic 138 may automatically bring down deployed resources during forecasted low seasons to conserve energy/resources. Thus, capacity planning operations may leverage the generated forecasts to increase the efficiency at which resources are deployed within a datacenter or cloud environment.

Data repository 140 includes volatile and/or non-volatile storage for storing data that are generated and/or used by analytic services 130. Example data that may be stored may include, without limitation, time-series data collected by data collector 130, seasonal pattern classifications generated by seasonality analytic 132, state change identification data generated by state change analytic 134, forecast data generated by forecasting analytic, and capacity planning actions/recommendations generated by capacity planning analytic 138. Data repository 140 may reside on a different host machine, such as a storage server that is physically separate from analytic services 130, or may be allocated from volatile or non-volatile storage on the same host machine.

Clients 150a to 150k represent one or more clients that may access analytic services 130 to generate forecasts and/or perform capacity planning operations. A "client" in this context may be a human user, such as an administrator, a client program, or some other application instance. A client may execute locally on the same host as analytic services 130 or may execute on a different machine. If executing on a different machine, the client may communicate with analytic services 130 via one or more data communication protocols according to a client-server model, such as by submitting HTTP requests invoking one or more of the services and receiving HTTP responses comprising results generated by one or more of the services. Analytic services 130 may provide clients 150a to 150k with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

3. State-Change Detection and Accomodation Analytic Overview

State change analytic 134 receives, as input, a time-series signal. In response state change analytic 134 processes the time-series signal to identify and extract state changes, if any, that exist within the signal. A "state change" in this context refers to a change in the "normal" characteristics of the signal. For example, a particular seasonal behavior/pattern may be detected within a first sub-period of the time-series signal until a particular point in time. After the point in time, the seasonal behavior/pattern may shift such that the new seasonal behavior of the signal differs from the seasonal behavior that was detected in the first sub-period. There are a variety of potential causes of a state change, which may vary depending on the particular implementation. In the context of monitoring the performance of target deployments, for instance, a patch or other update of a target resource may cause a recurring shape, amplitude, phase, and/or other characteristic of a time-series signal to change. In another example, a change in a batch job schedule performed on a target resource may cause a shift in the high and/or sparse high seasonal pattern from the beginning of the week to the end of a given week. If the state change is not accommodated, then the prior state may have a significant impact on the forecasted values (or other analytic output) for the time-series signal.

Figure 2:
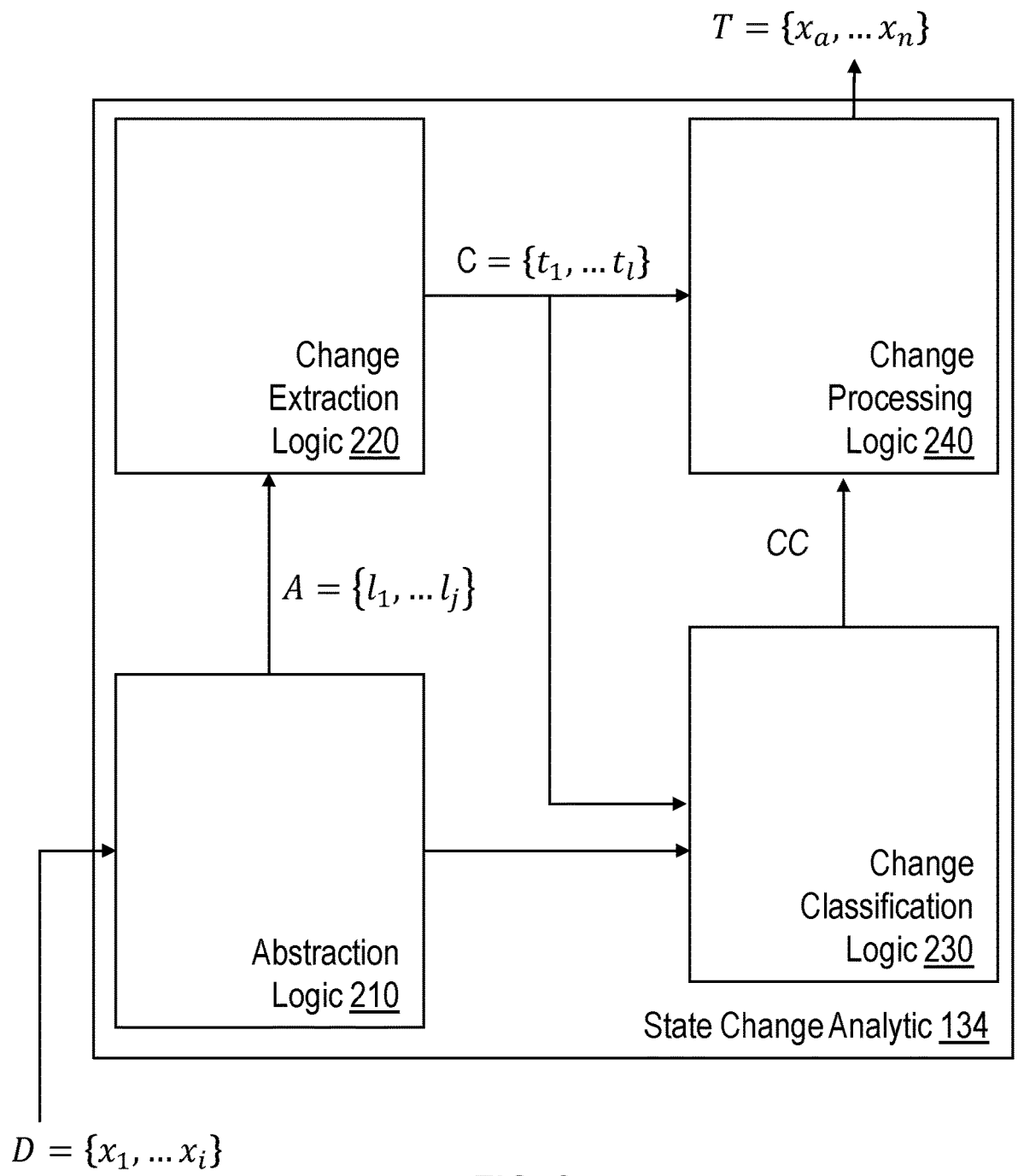
FIG. 2 illustrates an analytic for detecting and accommodating state changes in accordance with one or more embodiments.

Referring to FIG. 2, an example implementation of state change analytic 134 is illustrated in accordance with one or more embodiments. State change analytic 134 generally comprises abstraction logic 210, change extraction logic 220, change classification logic 230, and change processing logic 240. State change analytic 134 receives, as input for a given time-series signal, a set of time-series data denoted D, which captures a sequence of values $\{x_1, \ldots x_i\}$. Abstraction logic 210 processes the set of time-series data D to generate an "abstract" or "simplified" representation of the time-series denoted A. The simplified representation A comprises a set of representative values $\{a_1, \ldots a_j\}$, which summarize or approximate the behavior of the time-series signal. The representative values may correspond to linear approximations, nonlinear approximations, and/or seasonal pattern classifications. The time-series representation is processed by change extraction logic 220 to generate a set of changes C, which stores a set of change times $\{t_1, \ldots t_l\}$ for each change that is extracted from the time-series representation. Change classification logic 230 receives, as input, the set of changes C and the time-series representation A, and outputs change classification data CC, which classifies the changes within change set C as normal or abnormal. Change processing logic 240 receives the set of changes C and change classification data CC and selects a set of training data T from time-series D to use when training a forecasting model. The set of training data T comprises values $\{x_a, \ldots x_n\}$, which may comprise the entire sequence of values from the set of time-series data D or some subset of values therein. The set of training data T is output by state change analytic 134 and used by forecasting analytic 136 to train a forecasting model and generate forecasts. In other embodiments, the set of training data T may be used to train other models in addition or as an alternative to the forecasting model. Example models that may be trained may include, without limitation, correlation prediction models, anomaly detection models, and analytical models that are trained using one or more time-series signals.

Figure 3:
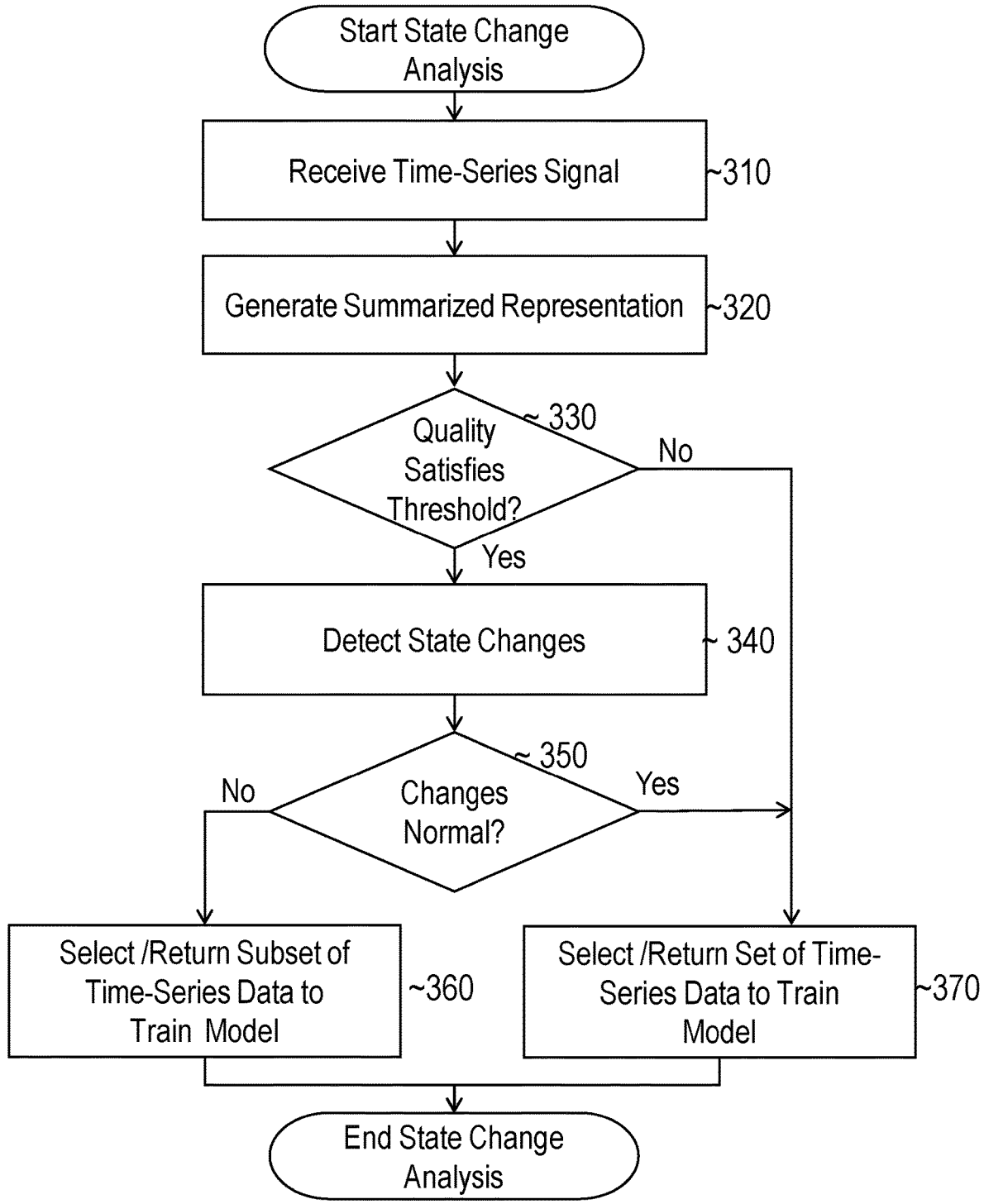
FIG. 3 illustrates an example set of operations for detecting and accommodating state changes in accordance with one or more embodiments.

With reference to FIG. 3, it depicts an example set of operations for detecting and accommodating state changes in accordance with one or more embodiments. At 310, the process receives a time-series signal that includes a sequence of values that measure an attribute associated with one or more targets over time. For example, the time-series signal may measure CPU usage, memory bandwidth, database logons, active sessions within a database system or other application, and any other hardware or software resource metric.

At 320, the process generates, within volatile or non-volatile storage, a representation of the time-series signal. The representation may correspond to a simplified, summarized, compressed, and/or smoothed version of the time-series signal. In one or more embodiments, the representation of the time-series signal comprises a set of linear piecewise approximations. In other embodiments, the representation may comprise nonlinear approximations and/or seasonal pattern classifications. Techniques for generating time-series representations are given in further detail below.

At 330, the process determines whether the quality of the time-series representation satisfies a threshold. The quality may be determined, based at least in part, on how well the representation summarizes the data points in the time-series signal. To make this determination, a statistical analysis may be performed to compare the time-series signal with the representation. For example, the coefficient of determination, denoted $R^2$, may be computed where the coefficient of determination indicates a variance between the representation and the sequence of values in the time-series. In order to compute the coefficient of determination, a set of residuals between the values in the time-series signal and the representation of the time-series signal may be determined, where a residual in this context represents a difference between a value in the time-series representation (an "abstracted" or "representative" value) and a corresponding value in the time-series signal. The coefficient of determination may then be computed from the squared coefficient of multiple correlation as follows:

$$R^2 = 1 - \Sigma_{i=1}^{n}(D_i - A_i)^2 \quad (9)$$

where $R^2$ is the coefficient of determination having a value between 0 and 1, $D_i$ is the time-series value at the $i^{th}$ position in the set of time-series data D, $A_i$ is the value of the time-series representation at the $i^{th}$ position, and $\Sigma_{i=1}^{n}(D_i - A_i)^2$ is the sum of the squared residuals. An $R^2$ value that is less than a threshold, such as 0.6, indicates that the representation does not account for a relatively large amount of variance in the time-series signal. This may occur, for example, when the data in the time-series cover a large range and is irregular. In this scenario, there may not be any definable states within the time series, and the entire sequence of time-series data may be selected to train the analytical model.

If the threshold is satisfied, then the process continues to 340, where a set of one or more changes within the abstracted time-series are detected. In response to detecting the set of one or more changes, the process may generate, with volatile and/or non-volatile storage, a set of change identification data. In one or more embodiments, the change identification includes a set of change times that identifies each detected state change within the time-series signal. For example, the change identification data may comprise an array of timestamps, with each timestamp identifying and corresponding to a change time of a respective change that was detected. A time within the array may be identified using a logical timestamp, such as a system change number (SCN), that defines the time in relation to other events in the system. In other embodiments, the time may be an actual time measured by a clock, such as the date, hour, minute, etc.

At 350, the process determines whether the extracted changes are normal. Techniques for detecting and classifying changes are described in further detail below.

If the changes are determined to be abnormal, then the process continues to 360 to accommodate the changes in the forecast and/or other analytical output. At 360, the process selects a subset of values from the input set of time series D in order to train the analytic model. In one or more embodiments, the selected subset of data comprises values within D that occur after the most recent abnormal state change that was detected. In order to identify the most recent abnormal state change, the process may read the change identification data to extract the timestamp corresponding to the latest change time. Timestamps corresponding to values within the set of time series data D may be compared to the extracted timestamp to determine which values occur after the corresponding change time. These values may be selected and returned to a forecasting or other analytic, which uses the subset to train an analytical model. Values that occur before the change time are ignored by the analytic and are not used to train the model. In the context of forecasting, values that occur before the change time do not affect the forecast to prevent previous states that are no longer relevant from influencing the forecasting model and causing inaccurate forecasts. Examples of how ignoring these values may lead to more accurate forecasts are given in further detail below.

If the summarized representation quality does not satisfy a threshold or the changes are determined to be normal, then the process continues to 370. At 370, the process selects and returns the set of time-series data D. The circumstances in which changes are determined to be normal may vary depending on the particular implementation. In one or more embodiments, the changes may be determined to be normal when state changes periodically recur. As an example, there may be two different types of seasonal patterns detected on a Monday, with a first pattern having a much higher peak value than the second type of Monday. The time-series signal may periodically alternate between these two types of Mondays, such as every other week, every third week of the month, or according to some other pattern. As the state changes periodically recur, they may be classified as normal. In this case, both states contribute to the forecast/analytic output, and values from the time-series signal that happen both before and after the change time are both included in the training set used to train the analytical model.

4. Time-Series Representations

Detecting and analyzing state changes directly from the raw time-series data may be difficult since there are often fluctuations in the data from one seasonal period to another. In order to facilitate state change detection and analysis, a time-series representation that models the behaviors within a time-series signal may be generated. For instance, a time-series representation may be generated as a set of one or more data objects that include a set of abstract values representing the behavior of a time-series signal over one or more seasonal periods. The abstract values may derived based on a classification, regression, and or minimum description length (MDL) based analysis as described further below. The abstract values may also be compressed to reduce data access times and storage overhead within a computing system when detecting and analyzing state changes.

A classification-based representation may comprise a set of classifiers for different sub-periods within a time-series signal. For instance, a time-series signal may be chunked into different sub-periods corresponding to one hour intervals or some other sub-period. Each interval may then be assigned a classification based on a seasonal analysis of the signal such as described in U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and/or U.S. application Ser. No. 15/057,062, entitled "UNSUPERVISED METHOD FOR CLASSIFYING SEASONAL PATTERNS", which were previously incorporated by reference. As an example, a given instance of a Monday from 8-9 a.m. may be classified as a sparse high, dense high, dense low, sparse low, or undetermined based on the analysis. In order to compress the representation, adjacent hours that are classified the same way may be merged together. Thus, if four adjacent sub-periods from 8 a.m. to 12 p.m. on Monday are classified as sparse high, then these sub-periods may be merged together and classified as sparse high to compress the summary data. The classifications for different seasonal periods may then be compared to detect state changes.

A regression-based simplified representation may comprise a set of one or more linear and/or nonlinear approximations for sequences (including sub-sequences) of values within the time-series signal. With a linear approximation, for instance, a linear regression model may be applied to different segments of a time series to fit a line to the sequence of values included in each separate segment. As a result, a set of linear approximations, referred to herein as a linear piecewise approximation, is generated for the time-series signal, with each separate "piece" or line within the set of linear approximations corresponding to a different segment within the time-series. In addition to generating linear approximations, regression models may also be used to generate nonlinear approximations, such as polynomial fits. Thus, the manner in which the representation is generated may vary depending on the particular implementation.

An MDL-based analysis may be used to generate an representation of the time-series signal, in accordance with one or more embodiments. The principle of MDL is that given a set of time-series data D, an summarization model is chosen in a manner that is able to compress the abstracted values by the greatest amount. For instance, within a given week or other seasonal period of time-series data, there may be many different ways in which linear piecewise approximations may be generated. A single constant value may be able to achieve the highest level of compression for the abstracted values. However, the single constant value may not serve as an accurate description of the behavior during that week. As a result, the residual values or functions that are stored to derive the original time-series signal from the representation may be relatively large in this case. The constant value maybe changed to a best fit line having a slope, which may represent a better description of the data. In this case, the representation may not be able to be compressed as much as a single constant value; however, the representation may represent a more accurate description of the time-series signal and the residual values may be more highly compressed. The line may be broken up into smaller and smaller segments until the model is identified that a) satisfies a threshold level of quality and/or b) achieves the highest level of compression between the representation and the residuals. In some instances, as previously indicated, a representation may be thrown out if the quality is below a threshold. For instance, if the $R^2$ indicates that the representation describes less than a threshold percentage (e.g., 70% or some other threshold) of the sequence of values summarized by the representation, then the representative values may be ignored.

Figure 4A:
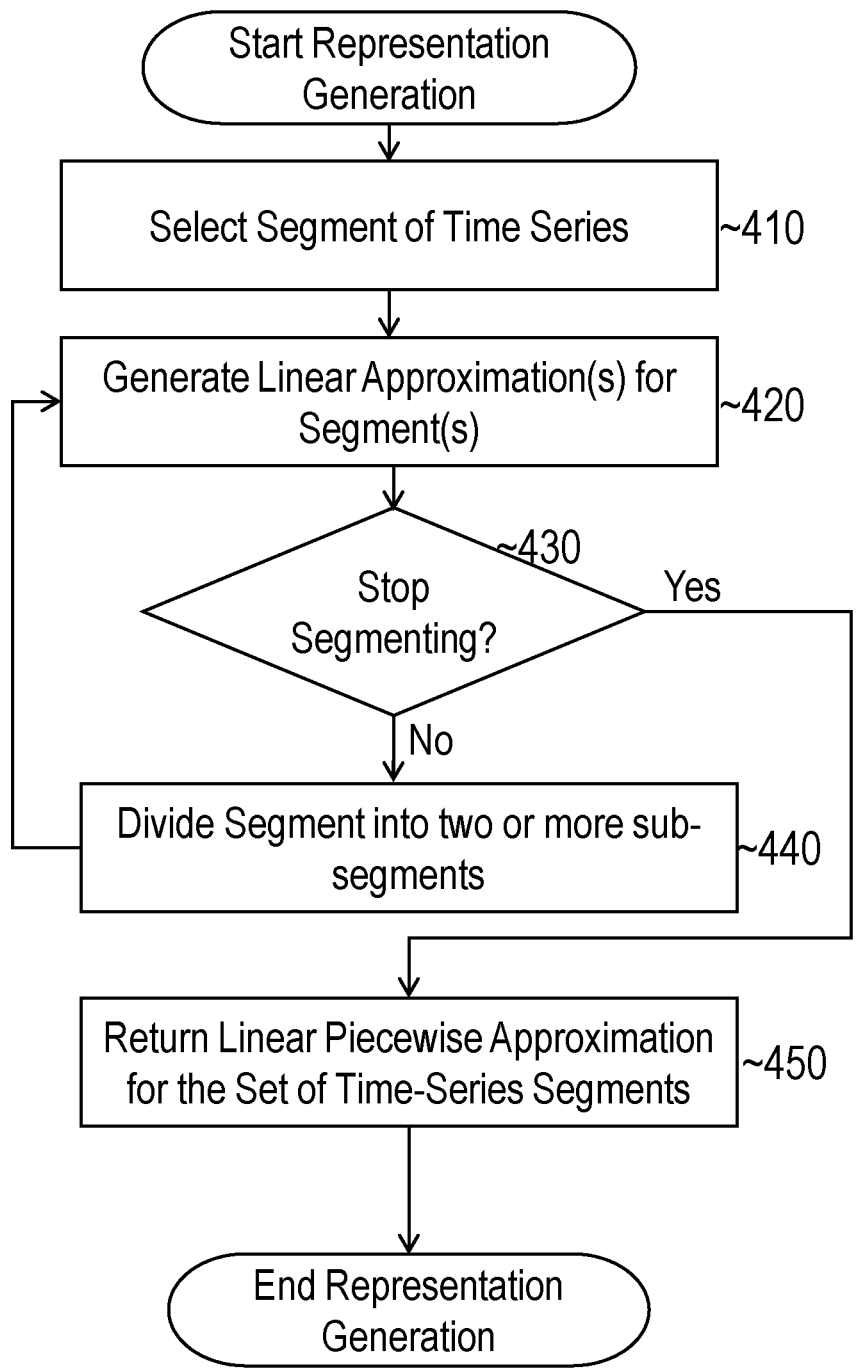
FIG. 4A illustrates an example set of operations for generating a representation of a time-series signal in accordance with one or more embodiments.

Referring to FIG. 4A, an example set of operations for generating a representation of a time-series is illustrated in accordance with one or more embodiments. At 410, the process selects a segment of a time-series. The manner in which the initial segment is selected may vary depending on the particular implementation. The process may segment time-series data by seasonal period, by seasonal pattern classification, or in any other way depending on the implementation.

At 420, the process generates a linear approximation of the selected segment. As previously indicated, the linear approximation may be computed using a linear regression model in order to fit a line to the values in the selected segment. Depending on the data set, the line may overlap one or more data points from the time-series within the segment or it may not overlap any data points in the segment.

At 430, the process determines whether to stop or continue segmenting the time-series signal based on the linear approximation that was generated for the selected segment. The determination may be made based on a set of segmentation rules or criteria that define the circumstances under which segmentation is continued. For instance, the segmentation rules may implement an MDL-based approach where the sequences of values are segmented until a set of linear approximations that maximize compression while satisfying a threshold level of quality is determined. On the other hand, segmentation may stop if the segments become too small (e.g., they contain less than a threshold number of values).

If the process determines that segmentation should continue, the process continues to 440. Otherwise, the process proceeds to 450.

At 440, the process divides the selected segment into two or more sub-segments. The break point(s) between the segments may vary depending on the particular implementation. In one or more embodiments, the segment may be broken in half. However, in other embodiments, the break points may be determined based on an analysis of the slopes/trends of the sequence of values that belong to the segments. By analyzing slopes or trends, a more accurate linear approximation may be derived. For instance, if breaking a segment in two, a first portion of the segment, which may be more or less than half the segment, may generally trend downward. The second portion of the segment may then slope upward. The break point may be selected in between these two portions of the segment, which allows a better fit to be derived through a linear regression model. Once the segment has been split into two or more sub-segments, the process returns to 430, and linear approximations are then generated for the two sub-segments. The process then continues for each of these sub-segments to determine whether to further segment the values within the time-series signal.

At 450, the process returns a linear piecewise approximation comprising multiple pieces/lines, where each piece/line corresponds to and approximates a different segment (or sub-segment) of the time-series signal. For example a first line may approximate values from a first portion of a seasonal period (e.g., Monday 9 a.m. to Tuesday 9 p.m. or any other sub-period), a second line may approximate values from a second portion of the seasonal period (e.g., Tuesday 9 p.m. to Wednesday 10 a.m.), etc.

Figure 4B:
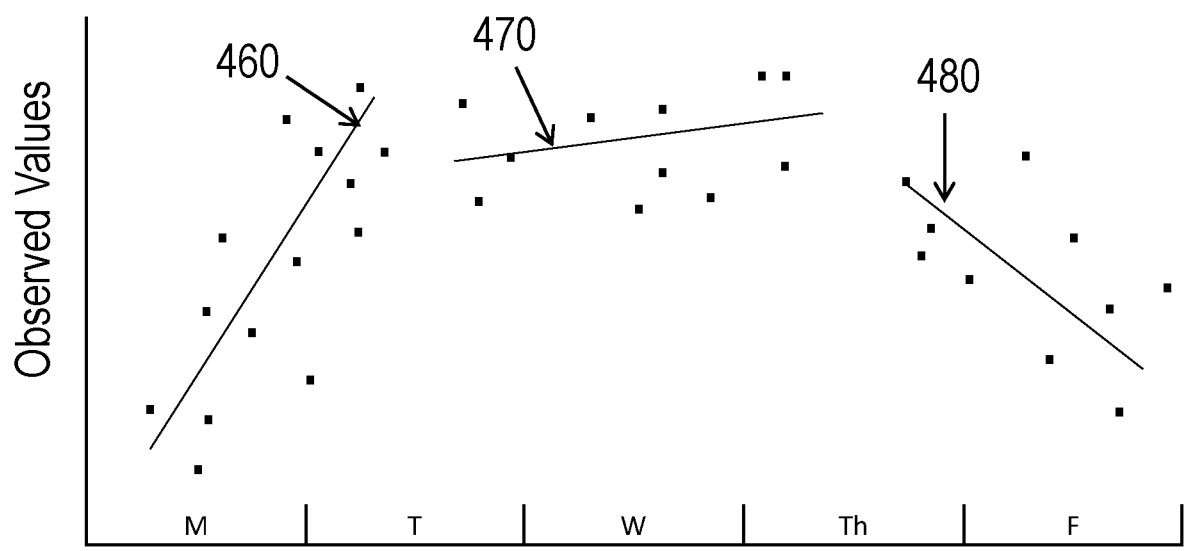
FIG. 4B illustrate an example representation of a time-series signal in accordance with one or more embodiments.

FIG. 4B illustrates an example representation of a time-series signal in accordance with one or more embodiments. The representation includes three linear approximations within the seasonal period depicted: linear approximation 460 representing a first portion of the week, linear approximation 470 representing a second portion, and linear approximation 480 representing a third portion. Similar linear piecewise approximations may be generated for other samples of the week within the time-series signal. The linear approximations allow for a compressed representation that describes the behavior of the time-series signal to be generated and analyzed to quickly detect state changes.

5. State Change Detection and Processing

Once generated, the time-series representation is analyzed to detect and process state changes within the time-series signal. With classification-based representation, the classifications may be compared across different seasonal periods. For example, Friday from 9 p.m. to 11 p.m. may be classified as a sparse high across multiple seasonal periods due to recurring maintenance and batch jobs being performed within a datacenter environment. If the recurring maintenance time is changed to Saturday from 8 p.m. to 10 p.m., a corresponding change in classification may be observed. The new normal for Friday from 9 p.m. to 11 p.m., previously classified as a sparse high, may suddenly change to low while Saturday from 8 p.m. to 10 p.m. becomes a sparse high. Thus, classifications across different seasonal periods may be compared and analyzed to detect if and when state changes have occurred.

State changes may also occur between sub-periods that have been classified the same way. For example, a dense high may undergo a step up or a step down in the normal seasonal pattern due to a change in circumstances. In the context of resource usage, this may be caused by a growth or decline in the number of users of an application or other resource. In such a scenario, the linear approximations across different seasonal periods may be compared and analyzed to detect if a state change has occurred.

Figure 5:
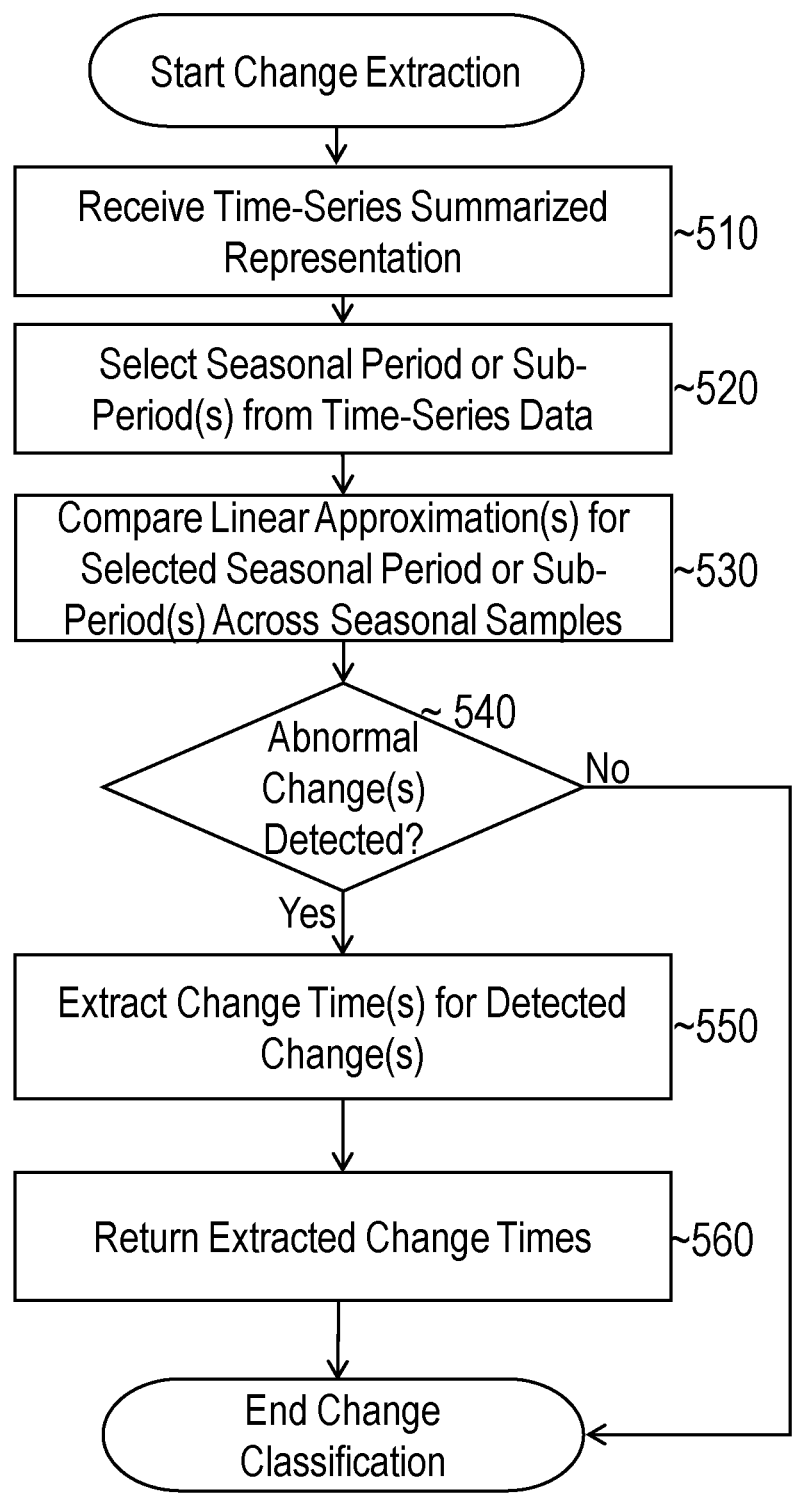
FIG. 5 illustrates an example set of operations for extracting a set of changes from a time-series signal in accordance with one or more embodiments.

FIG. 5 illustrates an example set of operations for extracting a set of changes from a time-series signal, in accordance with one or more embodiments. At 510, the process receives a time-series representation. The time-series representation may comprise a linear piecewise approximation and/or a set of classifications as previously described. The process may then analyze the representation to detect state changes as described further herein.

At 520, the process selects a seasonal period or sub-period from the time-series data. The seasonal period that is selected may be based on the seasonal pattern and classifications that are detected within the automatic time-series. For example, the techniques described in U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and/or U.S. application Ser. No. 15/057,062, entitled "UNSUPERVISED METHOD FOR CLASSIFYING SEASONAL PATTERNS", previously incorporated by reference, may be used to automatically detect and classify seasonal patterns within a time-series signal. For instance, if weekly patterns are detected, then a seasonal period of a week may be selected for analysis. Sub-periods of the week may also be selected based on the characteristics of the patterns that are detected within the week. If dense highs are detected during a certain sub-period of the week, for example, than this sub-period may be selected for analysis.

At 530, the process compares one or more linear approximations and/or classifications for the selected seasonal period (or sub-period) with linear approximations across one or more other seasonal samples within the time-series signal. The analysis compares the sub-periods to detect whether observable change in state may be detected. As an example, the first four sub-periods within a representation may indicate that these sub-periods were classified as sparse highs. The next four sub-periods may then indicate that these sub-periods are classified as low. As another example, the magnitude and/or slope of a sequence of linear approximations for the selected sub-period/segment may significantly and consistently step up or step down after a particular point in time. If the magnitude and/or slope does not change by a threshold amount and/or in more than a threshold number of samples, then the differences may be ignored. In other words, differences in the approximations that are not deemed statistically significant may be ignored and are not classified as changes. On the other hand, changes that are statistically significant are classified as changes and undergo further analysis. This step may be repeated for multiple sub-periods within a selected seasonal period to detect whether a state change has occurred for different segments of the week or other seasonal period.

At 540, the process determines whether a state change was detected. As previously mentioned, a state change may be detected if the linear approximations for the sub-period differ by a statistically significant amount between different seasonal samples and/or if the sub-period is classified differently between different samples within the time-series signal. If changes are detected, then the process continues to 550. Otherwise, the process ends and no changes are returned.

If at least one abnormal change has been detected, then at 550, a set of one or more change times for one or more corresponding state changes are extracted and stored. In one or more embodiments, the change times may identify the seasonal sample in which the change occurred. For example, if the state changes are detected in fifth and twelfth seasonal samples for a given set of time-series data, then change identification data may be generated that references these samples. In addition or alternatively, the change time may identify an absolute time, such as a date and hour, at which the change was detected. For instance, if a change was detected on Friday, June 24 at 10 a.m., then a timestamp identifying this time may be generated and stored with the change identification data.

At 560, the process returns change identification data comprising the extracted change times. The change times may be used to select the set of time-series data used to train a forecasting and/or other analytical model as described in further detail below.

Once detected, the state changes are further analyzed to determine whether they are normal or abnormal. Changes that are normal do not cause a "new" normal in the state of the time-series signal. As an example, two types of Monday may recur within a time-series signal-one with a relatively high resource usage and a second with a relatively low resource usage. Analyzing the representation, it may appear that the time-series signal periodically changes from one type of Monday to the other type of Monday. These changes may thus be classified as normal so that both types of Mondays may be used to generate the forecast and/or other analytical output.

Figure 6:
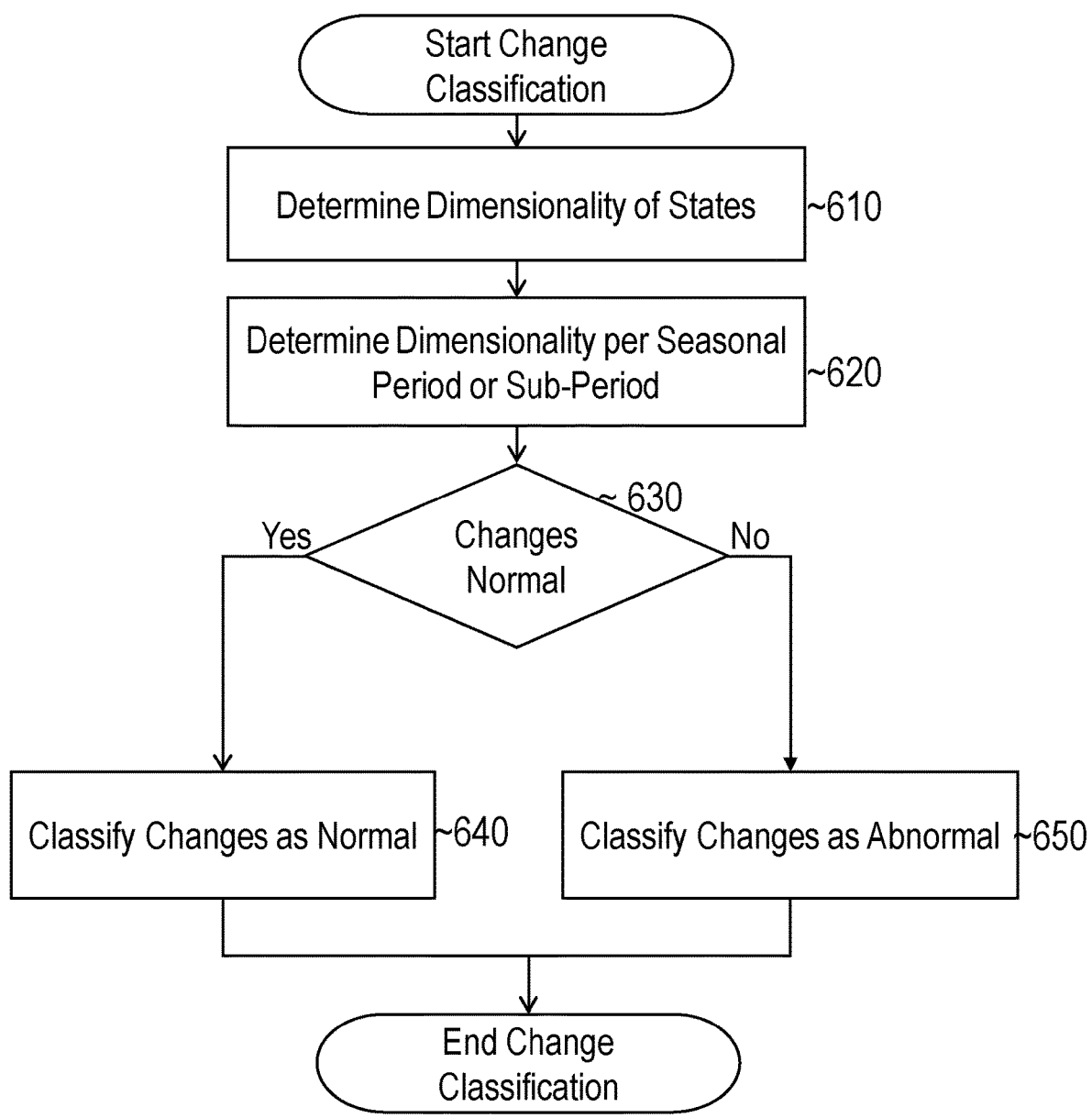
FIG. 6 illustrates an example set of operations for classifying a set of changes in accordance with one or more embodiments.

With reference to FIG. 6, an example set of operations for classifying extracted changes are illustrated, in accordance with one or more embodiments. At 610, the process determines the dimensionality of the state changes. The dimensionality in this context refers to how many different states within the time-series signal were detected. If a single state change was detected, then the time-series signal has two states and a dimensionality attribute may be assigned a value of "2". If more than one state change was detected, then the time-series signal may have two or more states. Thus, the dimensionality value may be assigned a value greater than two depending on the number of unique states that were detected.

At 620, the process determines the dimensionality per seasonal period or sub-period of the states. In the context of weekly seasonal periods, for instance, this attribute may be determined as the average number of states per week. To compute the value, the total number of states may be divided by the number of samples of the seasonal period that were analyzed. If four states were detected over eight samples, then this attribute may be assigned a value of "0.5". Similarly, if eight states were detected over the eight samples, then the attribute may be assigned a value of "1". However, any other formula that is a function of the dimensionality and the seasonal period may be used to compute a value at this step and may vary depending on the particular implementation.

At 630, the process determines, based on the dimensionality attribute and/or the dimensionality per seasonal period attribute, whether to classify the changes as normal. In one or more embodiments, a set of one or more thresholds are used to determine how to classify the changes. For instance, if there is fewer than one state per week (dimensionality/duration) or only two states (dimensionality=2), then it may be inferred that changes are not normal. The thresholds at this step may vary depending on the particular implementation. In other embodiments, it may be determined whether the state changes recur at periodic intervals. If the state changes recur, then the changes may be determined to be normal at this step. On the other hand, if the changes do not recur, then the changes may be classified as abnormal.

Based on the determination at 630, the process proceeds to either 640, where the changes are classified as normal, or 650, where the changes are classified as abnormal. In one or more embodiments, the change times are extracted, as described above, for abnormal changes that are detected within the time-series signal. Change time extraction may be skipped for changes, if any, that have been classified as normal.

6. Forecast Generation and Other Analytic Outputs

Based on the state change identification and classification, a set of training data is selected to train a forecasting model according to one or more embodiments. In the event that an abnormal change was detected, then a subset of the time-series data may be used to train the forecasting model. For instance, time-series data that occur before a change time corresponding to an abnormal change may be excluded from the training set while time-series data occurring after the change time may be included. Excluding the data before the change time prevents previous states that are no longer relevant from affecting the forecast. As a result, forecast accuracy may be improved.

The change time that is used to select the set of training data (herein referred to as a "tipping point") may either be automatically selected by the analytic or selected via external user input, depending on the particular implementation. For example, if automatically selected, the analytic may use the most recent detected abnormal state change as the target by which the set of training data is selected. Thus, time-series data that occur before the most recent change time is excluded from the training set of data while time-series data after the change time is included. In other embodiments, abnormal state changes that occurs before the most recent abnormal state change may be selected, either automatically or by a user, as the tipping point. If a previous state change is used, then data after the corresponding change time, including data that occur between the tipping point and the most recent abnormal state change, are used to train the forecasting model, and data before the change time corresponding to the tipping point are excluded. Thus, the change time that is selected may vary from implementation to implementation.

Figure 7:
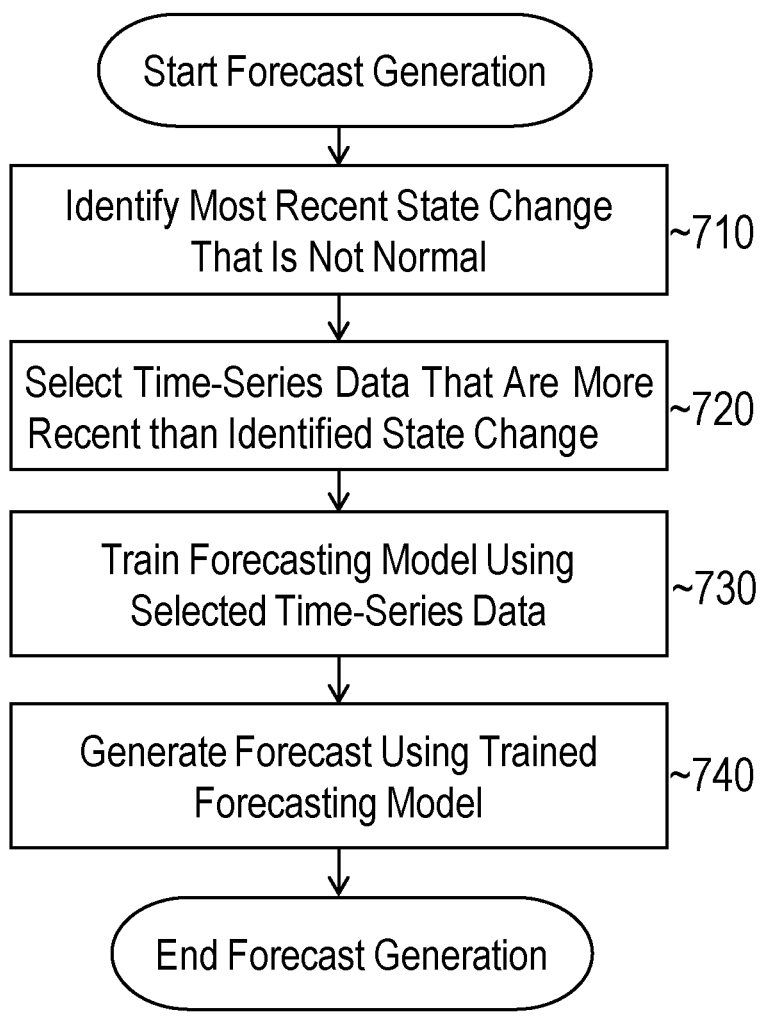
FIG. 7 illustrates an example set of operations for generating a forecast that accommodates state changes in accordance with one or more embodiments.

With reference to FIG. 7, an example set of operations for generating forecasts that accommodate state changes is illustrated, in accordance with one or more embodiments. At 710, the process identifies the most recent state change that is not normal. For instance, the process may parse the set of change times that were generated as described previously to identify the timestamp corresponding to the most recent abnormal state change.

At 720, the process selects time-series data that are more recent than the identified abnormal state change. In order to select the data, the process may compare the timestamp or other change time identifier against timestamps for the time-series data. Once the timestamp is matched to the timestamp of a sample data point in the time-series signal, data points in the time-series signal may be truncated. The remaining data points are included in a training set of data for the forecasting model.

At 730, the process trains a forecasting model using the selected time-series data. The manner in which the model is trained may vary depending on the particular forecasting model that is used. Example forecasting models are described in described in U.S. Appln. No. 62/301,590, entitled "SEASONAL AWARE METHOD FOR FORECASTING AND CAPACITY PLANNING", which was previously incorporated by reference. However, other forecasting models may also be trained at this step.

At 740, the process generates a forecast using the trained forecasting model. In the context of software and hardware, metrics, for example, the trained forecasting model may project future values for these metrics, such as predictions about future usage rates, based on the seasonal usage patterns detected after the most recent state changes. These projections may be useful in a variety of applications, including, but not limited to, anomaly detection and capacity and planning operations.

In one or more embodiments, the forecasting model is trained to forecast a steady-state of the time-series signal despite previously detected state changes. As previously described, the forecasting model is trained as if there were a single state in the time-series data used to train the model. This may be done by excluding, from the training set, values that have occurred in one or more states that existed prior to the most recent state change. Excluding values in this context may mean omitting them from the training set or, in other embodiments, adjusting the values as if there were no state changes. As an example, if a step up is detected, the values before the step up changes may be adjusted upward based on the size of the step before being included in the training set of data. In other words, the original value is excluded, and a new, adjusted value is added to the training set. Conversely, with a step down, the values within the time-series may be adjusted downward, and the new, adjusted value added to the training set of data. This allows the forecasting model to treat the training set of data as if they belong to a steady-state signal. The forecast may then project values as if there were no more state changes in the time-series signal.

Figure 8A:
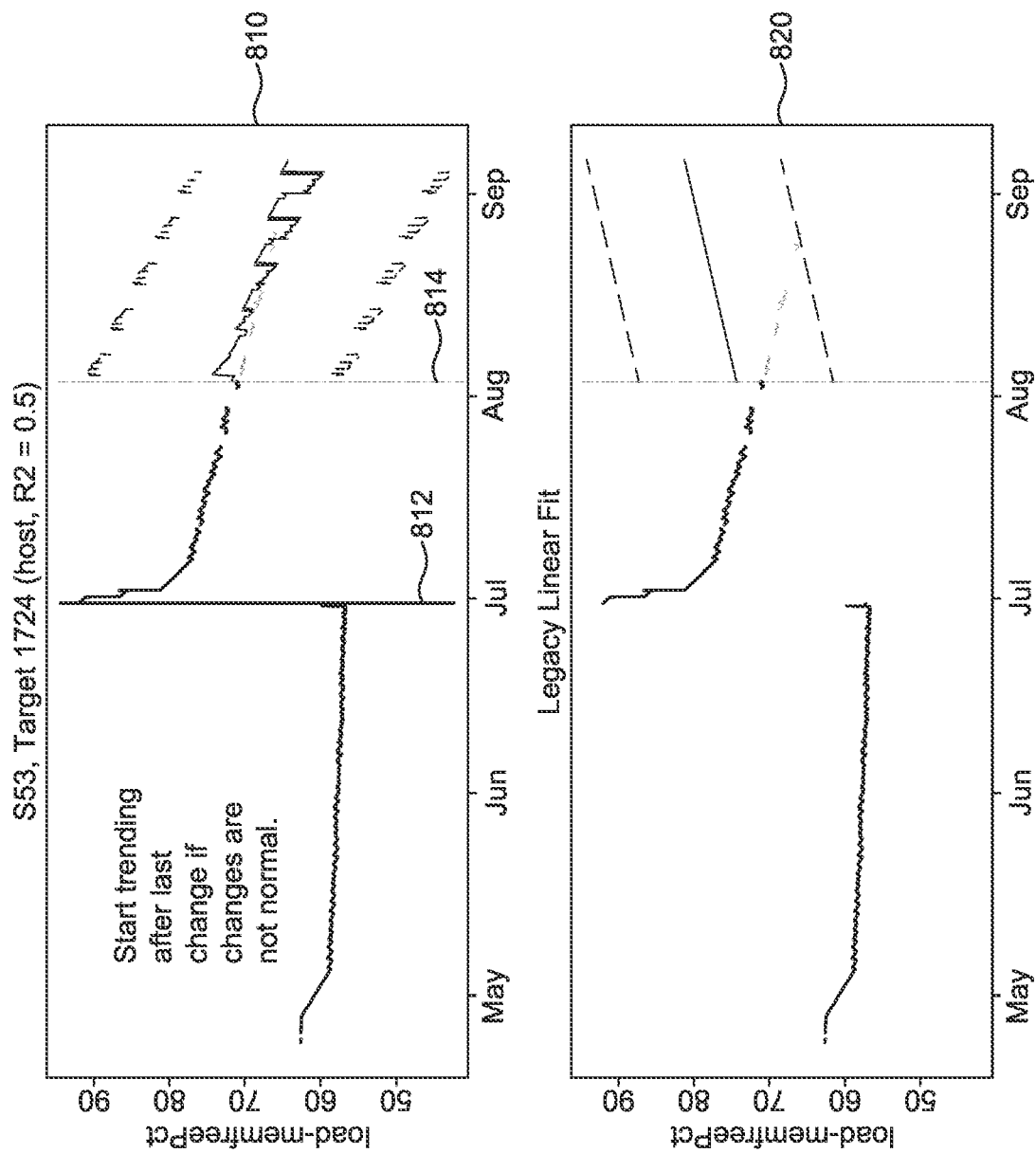
FIG. 8A illustrates an example forecast visualization that is generated in a manner that accounts for detected state changes.

FIG. 8A illustrates an example forecast visualization that is generated in a manner that accounts for detected state changes. Chart 810 depicts a forecast that accommodates the detected state change while chart 820 depicts a forecast that does not accommodate the state change. As can be seen from these charts, the time-series undergoes a significant change in state at change time 812. In chart 801, values from the time-series signal that occur before change time 812 are excluded from the training set of data. Rather, values between the change time 812 and the forecast time 814 are used to train the forecasting model and generate a forecast. The three plots that occur after forecast time correspond to the projected value and a tolerance level in the forecast, with the upper line corresponding to an upper tolerance level and the lower line corresponding to a lower tolerance level. Tolerance levels are described in further detail in U.S. Appln. No. 62/301,590, entitled "SEASONAL AWARE METHOD FOR FORECASTING AND CAPACITY PLANNING";

Chart 820 depicts a forecast when the entire set of time-series data, including values that occur before change time 812, are used to generate the forecast. As can be seen, the slope of the forecast changes direction due to the values that occur before the state change. As a result, the projections may be inaccurate when the previous state no longer represents the normal behavior of the monitored resources.

Figure 8B:
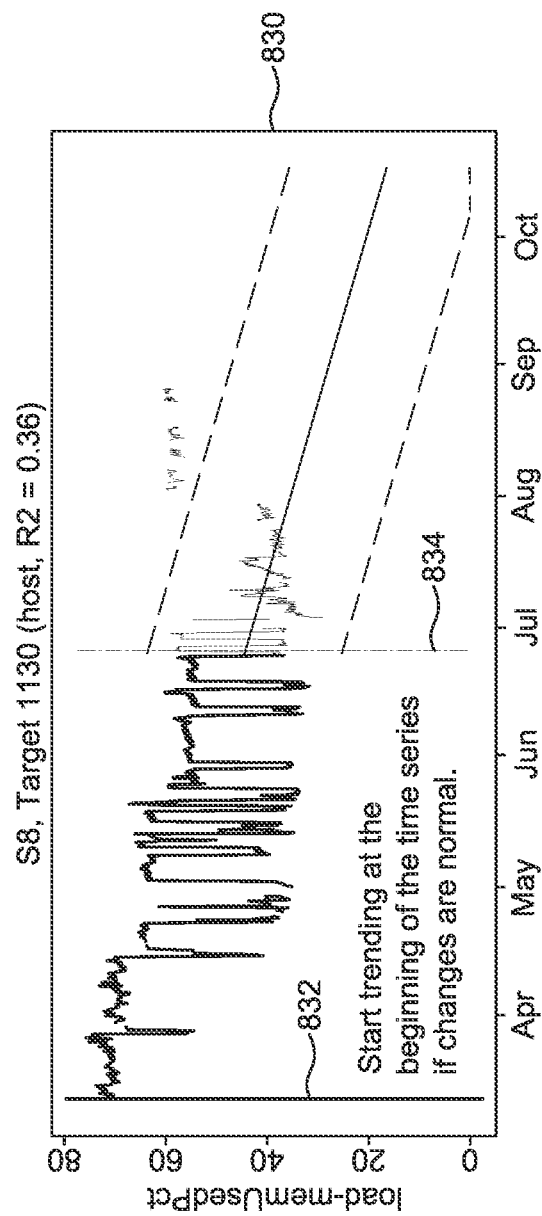
FIG. 8B illustrates an example forecast visualization that is generated when detected changes are classified as normal.

FIG. 8B illustrates an example forecast visualization that is generated when detected changes are classified as normal. In chart 830, the step changes occur at regular intervals, which is indicative that the changes follow a trend and are normal. Thus, the training set of data may include values between time 832, which corresponds to the beginning of the time-series, and time 834, which is when the forecast begins.

Figure 8C:
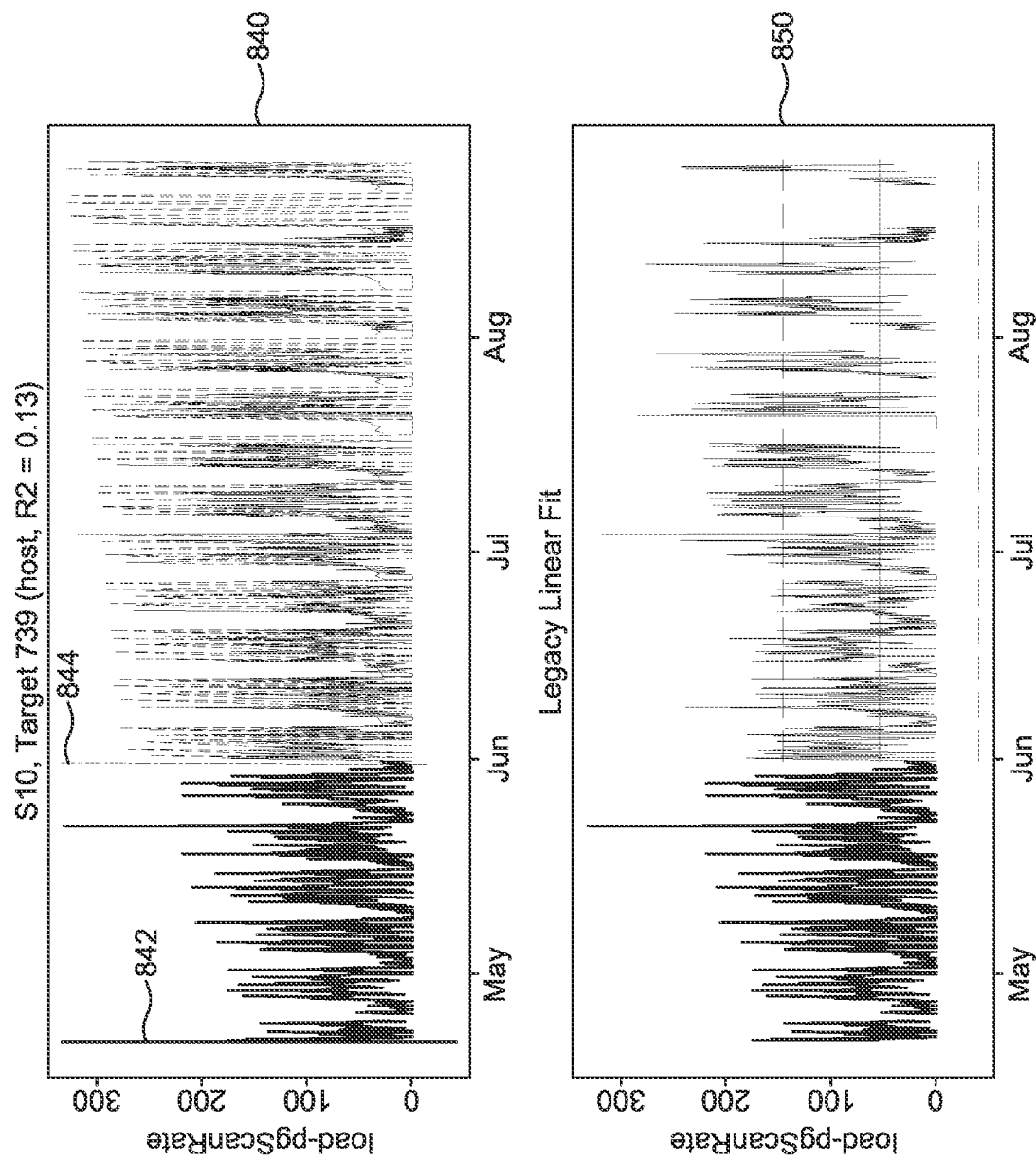
FIG. 8C illustrates an example forecast visualization that is generated when a quality of a time-series representation does not satisfy a threshold.

FIG. 8C illustrates an example forecast visualization that is generated when a quality of a time-series representation does not satisfy a threshold. In this case, the time-series data bounces around frequently, affecting the quality of the representation. If a high-quality representation is not able to represent the time-series signal, then the training set may be selected from the beginning of the time series, at time 842, to the forecast time depicted at 844. Chart 840 depicts the forecasted values and tolerance values, which are difficult to separate due to the high level of fluctuation in the data. Chart 850 depicts a linear fit for the tolerance levels and the projected values allowing for an easier view of the forecast.

If multiple state changes are detected, then change identification data may be displayed concurrently with the visualization of the time-series signal and/or forecast. For instance, a visual indicator may identify each time on the chart where an abnormal state change was automatically identified. The user may select the change time to adjust the forecast. Referring again to FIG. 8A, for instance, the change time 812 may be initially selected to generate the first forecast. If the user wishes to see how selecting a different tipping point and adjusting the training set of data affects the forecast, then the user may select another change time, if any, that has been detected. In this scenario, the forecast and visualization may be updated from chart 810 to 820 in real-time in response to the user selection. This allows the user to navigate between different state changes to see how the forecast is affected. If the user determines that a previous state is still relevant, then the user may move the target change time back to accommodate this state when generating the forecast.

In one or more embodiments, a slider may be displayed with a forecast to allow a user to adjust the tipping point. For example, the slider may be initially set at the most recent abnormal state change that was detected. The user may move the slider back in time along the chart to include additional time-series data in the training set of data or forward in time to reduce the amount of time-series data that are included in the training set of data. The forecast may be updated in real-time as the user is adjusting the slider so that the user is able to view how different training sets affect the forecast.

The forecasts that are generated may be used to recommend and/or automatically perform capacity planning operations in accordance with one or more embodiments. Example capacity planning operations may include without limitation, deploying additional resources in anticipation of a forecast of increased demand, shutting down or otherwise bringing down resources in anticipation of a forecast of reduced demand, ordering additional resources to be deployed within an environment, load balancing of resources across multiple hosts, and/or consolidating resources from multiple targets into a single target.

In addition or as an alternative to capacity planning the forecasts may be integrated into other applications, such as anomaly detection and correlation prediction. For instance, an anomaly detection application may predict correlation between two or more time-series signals and raise a flag or other notification to alert a user if observed resource patterns significantly differ from projected behavior. In the event that a state change is detected in one or more of the time-series signals being correlated or in a correlation-time series that is built using the time-series signals, a correlation prediction model may be trained using the data after the most recent state change and excluding time-series data from one or more of the signals before the state change. This allows a steady-state correlation to be projected as if there were no state changes in the signal correlation signal.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
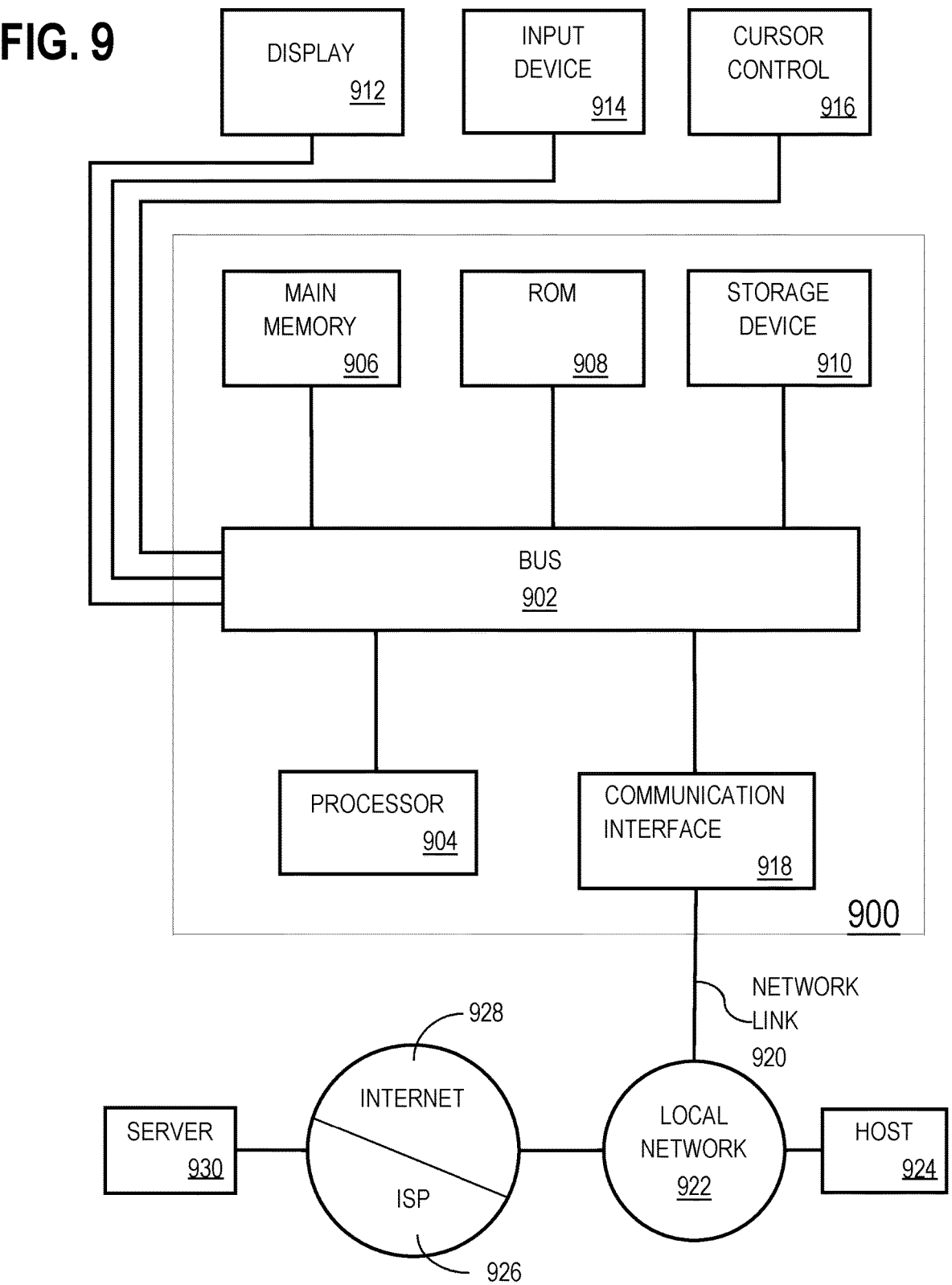
FIG. 9 illustrates an example computer system on which one or more embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media are distinct from but may be used in conjunction with transmission media. Transmission media participate in transferring information between storage media. For example, transmission media include coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving a time-series signal that includes a sequence of values captured by one or more computing devices over time;
  generating, within at least one of volatile or non-volatile storage of at least one computing device, a representation of the time-series signal;
  determining whether an average number of states per seasonal period within the representation of the time-series signal satisfies a threshold;
  responsive to determining that the average number of states per seasonal period does not satisfy the threshold:
    (a) classifying, as abnormal by at least one computing device, a first state change of a plurality of state changes within the representation of the time-series signal that is abnormal; and (b) classifying, as normal by the at least one computing device, a second state change that recurs seasonally at least after the first state change;

selecting, based at least in part on the first state change and the second state change, a subset of values from the sequence of values to train a model as if there were no state changes in the time-series signal, wherein the subset of values excludes one or more values that occurred prior to the first state change and includes one or more values that occurred prior to the second state change;

training, by at least one computing device, the model using the selected subset of values, from the sequence of values, that excludes the one or more values that occurred prior to the first state change and includes the one or more values that occurred prior to the second state change; and generating, within at least one of volatile or non-volatile storage of at least one computing device, an analytical output using the trained model.

2. The method of claim 1, wherein the subset of values from the sequence of values is a subset of values that occur in the time-series signal after a most recent state change that has been classified as abnormal in the plurality of state changes.

3. The method of claim 1, wherein the representation of the time-series signal is a linear piecewise approximation of the sequence of values captured by the one or more computing devices over time.

4. The method of claim 1, further comprising displaying, for each respective state change of the plurality of state changes, an indication of a change time of the respective state change.

5. The method of claim 1, wherein the analytical output comprises a representation of a forecast, the method further comprising:

receiving a selection of a graphical object that represents a particular state change in the plurality of state changes;

in response to receiving the selection of the graphical object that represents the particular state change:
updating the subset of values used to train the model;
retraining the model using the updated subset of values; and
generating, within at least one of volatile or non-volatile storage of at least one computing device, an updated forecast using the retrained model.

6. The method of claim 1, further comprising:
determining that a quality of the representation of the time-series signal satisfies a quality threshold;
wherein identifying, by at least one computing device, a set of one or more state changes within the representation of the time-series signal is performed in response to determining that the quality of the representation of the time-series signal satisfies the quality threshold.

7. The method of claim 6, wherein determining that the representation of the time-series signal satisfies the quality threshold comprises:
computing a coefficient of determination based on a set of residuals between the time-series signal and the representation of the time-series signal;
determining that the representation of the time-series signal satisfies the quality threshold if the coefficient of determination is greater than a threshold value.

8. The method of claim 1, further comprising:
receiving a second time-series signal that comprises a second sequence of values captured by one or more computing devices over time;
generating, within at least one of volatile or non-volatile storage of at least one computing device, a second representation for the second time-series signal;
determining whether a quality of the second representation satisfies a quality threshold;
in response to determining that the quality of the second representation does not satisfy the threshold, selecting the entire second sequence of values within the second time-series signal to train a second model;
in response to determining that the quality of the second representation satisfies the quality threshold:
detecting at least one abnormal state change within the second representation; and
training the second model using a subset of the sequence of values that occur after the at least one abnormal state change.

9. One or more non-transitory computer-readable media storing instructions, which when executed by one or more hardware processors, cause at least one computing device to perform operations comprising:

receiving a time-series signal that includes a sequence of values captured by one or more computing devices over time;

generating, within at least one of volatile or non-volatile storage of at least one computing device, a representation of the time-series signal;

determining whether an average number of states per seasonal period within the representation of the time-series signal satisfies a threshold;

responsive to determining that the average number of states per seasonal period does not satisfy the threshold:
(a) classifying, as abnormal by at least one computing device, a first state change of a plurality of state changes within the representation of the time-series signal that is abnormal; and
(b) classifying, as normal by the at least one computing device, a second state change that recurs seasonally at least after the first state change;

selecting, based at least in part on the first state change and the second state change, a subset of values from the sequence of values to train a model as if there were no state changes in the time-series signal, wherein the subset of values excludes one or more values that occurred prior to the first state change and includes one or more values that occurred prior to the second state change;

training, by at least one computing device, the model using the selected subset of values, from the sequence of values, that excludes the one or more values that occurred prior to the first state change and includes the one or more values that occurred prior to the second state change; and generating, within at least one of volatile or non-volatile storage of at least one computing device, an analytical output using the trained model.

10. The one or more non-transitory computer-readable media of claim 9, wherein the subset of values from the sequence of values is a subset of values that occur in the time-series signal after a most recent state change that has been classified as abnormal in the plurality of state changes.

11. The one or more non-transitory computer-readable media of claim 9, wherein the representation of the time-series signal is a linear piecewise approximation of the sequence of values captured by the one or more computing devices over time.

12. The one or more non-transitory computer-readable media of claim 9, the instructions further causing operations comprising displaying, for each respective state change of the plurality of state changes, an indication of a change time of the respective state change.

13. The one or more non-transitory computer-readable media of claim 9, wherein the analytical output comprises a representation of a forecast, the instructions further causing operations comprising:
receiving a selection of a graphical object that represents a particular state change in the plurality of state changes;
in response to receiving the selection of the graphical object that represents the particular state change:
updating the subset of values used to train the model;
retraining the model using the updated subset of values; and
generating, within at least one of volatile or non-volatile storage of at least one computing device, an updated forecast using the retrained model.

14. The one or more non-transitory computer-readable media of claim 9, the instructions further causing operations comprising:
determining that a quality of the representation of the time-series signal satisfies a quality threshold;
wherein identifying, by at least one computing device, a set of one or more state changes within the representation of the time-series signal is performed in response to determining that the quality of the representation of the time-series signal satisfies the quality threshold.

15. The one or more non-transitory computer-readable media of claim 14, wherein instructions for determining that the representation of the time-series signal satisfies the quality threshold comprise instructions, which when executed by one or more hardware processors, cause operations comprising:
computing a coefficient of determination based on a set of residuals between the time-series signal and the representation of the time-series signal;
determining that the representation of the time-series signal satisfies the quality threshold if the coefficient of determination is greater than a threshold value.

16. The one or more non-transitory computer-readable media of claim 9, wherein the instructions further cause operations comprising:
receiving a second time-series signal that comprises a second sequence of values captured by one or more computing devices over time;
generating, within at least one of volatile or non-volatile storage of at least one computing device, a second representation for the second time-series signal;
determining whether a quality of the second representation satisfies a quality threshold;
in response to determining that the quality of the second representation does not satisfy the quality threshold, selecting the entire second sequence of values within the second time-series signal to train a second model;
in response to determining that the quality of the second representation satisfies the quality threshold:
detecting at least one abnormal state change within the second representation; and
training the second model using a subset of the sequence of values that occur after the at least one abnormal state change.

17. A system comprising:
one or more hardware processors;
one or more non-transitory computer-readable media storing instructions, which when executed by one or more hardware processors, cause:
receiving a time-series signal that includes a sequence of values captured by one or more computing devices over time;
generating, within at least one of volatile or non-volatile storage of at least one computing device, a representation of the time-series signal;
determining whether an average number of states per seasonal period within the representation of the time-series signal satisfies a threshold;
responsive to determining that the average number of states per seasonal period does not satisfy the threshold:
(a) classifying, as abnormal by at least one computing device, a first state change of a plurality of state changes within the representation of the time-series signal that is abnormal; and
(b) classifying, as normal by the at least one computing device, a second state change that recurs seasonally at least after the first state change;
selecting, based at least in part on the first state change and the second state change, a subset of values from the sequence of values to train a model as if there were no state changes in the time-series signal, wherein the subset of values excludes one or more values that occurred prior to the first state change and includes one or more values that occurred prior to the second state change;
training, by at least one computing device, the model using the selected subset of values, from the sequence of values, that excludes the one or more values that occurred prior to the first state change and includes the one or more values that occurred prior to the second state change; and
generating, within at least one of volatile or non-volatile storage of at least one computing device, an analytical output using the trained model.

18. The system of claim 17, wherein the subset of values from the sequence of values is a subset of values that occur in the time-series signal after a most recent state change that has been classified as abnormal in the plurality of state changes.

19. The system of claim 17, wherein the representation of the time-series signal is a linear piecewise approximation of the sequence of values captured by the one or more computing devices over time.

20. The system of claim 17, wherein the instructions further cause displaying, for each respective state change of the plurality of state changes, an indication of a change time of the respective state change.

* * * * *

UNITED STATES PATENT AND TRADEMARK OFFICE
CERTIFICATE OF CORRECTION

PATENT NO. : 10,970,891 B2  
APPLICATION NO. : 15/266979  
DATED : April 6, 2021  
INVENTOR(S) : Garvey et al.

Page 1 of 1

It is certified that error appears in the above-identified patent and that said Letters Patent is hereby corrected as shown below:

On the Title Page

On page 3, Column 1, under Other Publications, Line 6, delete "Infrustructure" and insert -- Infrastructure --, therefor.

On page 4, Column 2, under Other Publications, Line 11, delete "pattem" and insert -- pattern --, therefor.

In the Specification

In Column 7, Line 37, delete "Accomodation" and insert -- Accommodation --, therefor.

In Column 8, Line 25, delete "Tis" and insert -- T is --, therefor.

In Column 10, Line 26, delete "and or" and insert -- and/or --, therefor.

In Column 16, Lines 54-55, delete "PLANNING;"" and insert -- PLANNING." --, therefor.

In Column 16, Lines 56-62, delete "Chart 820 depicts a forecast when the entire set of time-series data, including values that occur before change time 812, are used to generate the forecast. As can be seen, the slope of the forecast changes direction due to the values that occur before the state change. As a result, the projections may be inaccurate when the previous state no longer represents the normal behavior of the monitored resources." and insert the same on Column 16, Line 55, as a continuation of the same paragraph.

Signed and Sealed this  
Twenty-seventh Day of July, 2021

Drew Hirshfeld  
*Performing the Functions and Duties of the  
Under Secretary of Commerce for Intellectual Property and  
Director of the United States Patent and Trademark Office*